US008638749B2

(12) United States Patent
Cherian et al.

(10) Patent No.: US 8,638,749 B2
(45) Date of Patent: Jan. 28, 2014

(54) METHOD AND APPARATUS FOR INTER-NETWORK HANDOFF

(75) Inventors: George Cherian, San Diego, CA (US); Jun Wang, La Jolla, CA (US); Kalle Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 12/476,969

(22) Filed: Jun. 2, 2009

(65) Prior Publication Data

US 2009/0303966 A1 Dec. 10, 2009

Related U.S. Application Data

(60) Provisional application No. 61/059,677, filed on Jun. 6, 2008.

(51) Int. Cl.
*H04W 36/12* (2009.01)
*H04W 36/00* (2009.01)

(52) U.S. Cl.
CPC ...... *H04W 36/0016* (2013.01); *H04W 36/0005* (2013.01); *H04L 2212/0025* (2013.01)
USPC ........ 370/331; 370/338; 370/395.5; 455/403; 455/422.1

(58) Field of Classification Search
CPC ................... H04W 36/0016; H04W 36/0005; H04L 67/148; H04L 69/08; H04L 2012/5617; H04L 2212/0025; H04L 2012/5621
USPC ............. 370/310–350, 395.5; 455/422.1–465
See application file for complete search history.

(56) References Cited

U.S. PATENT DOCUMENTS

| 6,909,899 | B2 | 6/2005 | Wang et al. |
| 7,046,647 | B2 | 5/2006 | Oba et al. |
| 7,978,683 | B2 | 7/2011 | Balogh et al. |
| 8,145,217 | B2 | 3/2012 | Wang et al. |
| 2002/0136226 | A1 | 9/2002 | Christoffel et al. |
| 2002/0194385 | A1 | 12/2002 | Linder et al. |
| 2003/0104814 | A1 | 6/2003 | Gwon et al. |
| 2003/0125027 | A1 | 7/2003 | Gwon et al. |

(Continued)

FOREIGN PATENT DOCUMENTS

| CN | 1505413 A | 6/2004 |
| CN | 1756237 A | 4/2006 |

(Continued)

OTHER PUBLICATIONS

Samsung, Generic Approach for optimized non-3GPP handover, Aug. 2007.*

(Continued)

*Primary Examiner* — Charles C Jiang
*Assistant Examiner* — Mohamed Kamara
(74) *Attorney, Agent, or Firm* — James T. Hagler

(57) ABSTRACT

Systems and methodologies are described that facilitate inter-network handoff in a wireless communication system. Various aspects described herein provide for handoff techniques that enable a target system to be prepared by an access terminal via a source system in order to minimize specific changes required to source system and/or target system. Techniques are described herein in which the protocols of a source system can be utilized with an interworking unit to tunnel signaling messages which are in a format understood by a target network.

41 Claims, 18 Drawing Sheets

(56) References Cited

U.S. PATENT DOCUMENTS

| | | | |
|---|---|---|---|
| 2004/0008632 A1* | 1/2004 | Hsu et al. | 370/252 |
| 2004/0125795 A1 | 7/2004 | Corson et al. | |
| 2004/0203787 A1 | 10/2004 | Naghian | |
| 2005/0143072 A1 | 6/2005 | Yoon et al. | |
| 2005/0272432 A1 | 12/2005 | Ji et al. | |
| 2006/0018280 A1 | 1/2006 | Kumar et al. | |
| 2006/0045049 A1 | 3/2006 | Chung et al. | |
| 2006/0046728 A1 | 3/2006 | Jung et al. | |
| 2006/0072512 A1 | 4/2006 | Das et al. | |
| 2006/0099949 A1 | 5/2006 | Jung et al. | |
| 2006/0114871 A1 | 6/2006 | Buckley et al. | |
| 2006/0126565 A1 | 6/2006 | Shaheen | |
| 2006/0140150 A1 | 6/2006 | Olvera-Hernandez et al. | |
| 2006/0203774 A1 | 9/2006 | Carrion-Rodrigo | |
| 2007/0036109 A1 | 2/2007 | Kwak et al. | |
| 2007/0160049 A1 | 7/2007 | Xie et al. | |
| 2007/0165574 A1 | 7/2007 | Srey et al. | |
| 2007/0177585 A1 | 8/2007 | El Mghazli et al. | |
| 2007/0249352 A1* | 10/2007 | Song et al. | 455/436 |
| 2007/0254625 A1 | 11/2007 | Edge | |
| 2007/0258399 A1* | 11/2007 | Chen | 370/328 |
| 2008/0089272 A1 | 4/2008 | Ahokangas | |
| 2008/0089287 A1 | 4/2008 | Sagfors et al. | |
| 2008/0092224 A1 | 4/2008 | Coulas et al. | |
| 2008/0165740 A1 | 7/2008 | Bachmann et al. | |
| 2008/0259869 A1 | 10/2008 | Wang et al. | |
| 2008/0281978 A1 | 11/2008 | Tang et al. | |
| 2008/0305796 A1 | 12/2008 | Dolan | |
| 2008/0318575 A1 | 12/2008 | Ulupinar et al. | |
| 2009/0016300 A1 | 1/2009 | Ahmavaara et al. | |
| 2009/0040981 A1 | 2/2009 | Agashe et al. | |
| 2009/0111468 A1 | 4/2009 | Burgess et al. | |
| 2009/0176489 A1 | 7/2009 | Ulupinar et al. | |
| 2009/0201878 A1* | 8/2009 | Kotecha et al. | 370/331 |
| 2009/0202966 A1 | 8/2009 | Teicher et al. | |
| 2009/0258631 A1* | 10/2009 | Forsberg et al. | 455/411 |
| 2009/0271623 A1* | 10/2009 | Forsberg et al. | 713/168 |
| 2009/0286527 A1 | 11/2009 | Cheon et al. | |
| 2010/0061340 A1 | 3/2010 | Ramle et al. | |
| 2010/0190500 A1* | 7/2010 | Choi et al. | 455/436 |
| 2011/0044198 A1* | 2/2011 | Persson et al. | 370/252 |

FOREIGN PATENT DOCUMENTS

| | | |
|---|---|---|
| EP | 1441483 A2 | 7/2004 |
| EP | 1746856 A1 | 1/2007 |
| JP | 2008503108 A | 1/2008 |
| JP | 2008507875 A | 3/2008 |
| JP | 2008519568 A | 6/2008 |
| JP | 2010534999 A | 11/2010 |
| KR | 20060124397 A | 12/2006 |
| KR | 20070046012 A | 5/2007 |
| KR | 101042763 B1 | 6/2011 |
| RU | 2004137498 A | 6/2005 |
| RU | 2260919 C2 | 9/2005 |
| RU | 2265282 C2 | 11/2005 |
| TW | 535450 B | 6/2003 |
| TW | 200541248 | 12/2005 |
| TW | M294789 U | 7/2006 |
| WO | 0031946 A2 | 6/2000 |
| WO | 03030460 A2 | 4/2003 |
| WO | WO2005036804 A2 | 4/2005 |
| WO | WO2006011053 A1 | 2/2006 |
| WO | WO2006049464 A1 | 5/2006 |
| WO | WO 2006052563 A2 | 5/2006 |
| WO | WO2006083039 | 8/2006 |
| WO | WO2006102650 A1 | 9/2006 |
| WO | WO2007007990 A1 | 1/2007 |
| WO | WO2008115757 | 9/2008 |
| WO | WO2008157633 | 12/2008 |
| WO | WO2009002586 A2 | 12/2008 |
| WO | WO2009012191 A2 | 1/2009 |
| WO | WO2009037623 A2 | 3/2009 |
| WO | WO2009154640 A2 | 12/2009 |

OTHER PUBLICATIONS

3GPP TS36.300 v0.9.0 Evolved Universal Terrestrial Radio Access (E-UTRA) and Evolved Universal Terrestrial Radio Access Network (E-UTRAN); Overall description; 3GPP Technical Specification Group Radio Access. Network, [Online] Mar. 4, 2007, p. 49.

"3rd Generation Partnership Project; Technical Specification Group Core Network and Terminals;3GPP System Architecture Evolution ; CT WG1 Aspects(Release 8)" 3GPP Draft; 24801-100, 3rd Generation Partnership Project (3GPP), Mobile Competence Centre ; 650, Route Des Lucioles ; F-06921 Sophia-Antipolis Cedex ; France, vol. CT WG1, No. Zagreb, Croatia; 20080623, May 21, 2008, XP050029410, Chapter 7.3.3.2.1; p. 56 Chapters 9.4.1-9.4.3; pp. 69-70 Chapter 10.4; p. 85 Chapters 10.14.1.1.2-10.14.1.1.3; p. 93.

Technical Specification Group Services and System Aspects: "Architecture enhancements for non-3GPP accesses TS 23.402 V8.0.0 (Release 8)" 3GPP-Standards, 2500 Wilson Boulevard,Suite 300, Arlington, Virginia 22201 USA,Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.

3GPP: "Optimized Handover Procedures and Protocols between EUTRAN Access and cdma2000 HRPD Acess—Stage 3 (Release 8)" 3rd Generation Partnership Project;Technical Specification Group Core Network and Terminals; 3GPP Evolved Packet Systems, Jun. 6, 2008, pp. 1-21, XP002542969, Chapter 1; p. 7 Chapter 4; p. 8 Chapters 7.3-7.3.3; pp. 10-12 Chapter 7.5.6; p. 17.

3GPP2: "UMB and HRPD/Ix Interworking, X.S0054-610-0 Version 1.0" 3GPP2, [Online] Aug. 29, 2008, pp. 1-60, XP002529917 Retrieved from the Internet: www.3gpp2.org/Public_html/specs / X.S0054-610-0_vl.0_080909.pdf> paragraphs [003.]-[5.1.3.].

Dutta, A. et al.: Columbia Univ: "A Framework of Media-Independent Pre-Authentication (MPA); draft-ohba-mobopts-mpa-framework-OO.txt" IETF Standard-Working-Draft, Internet Engineering Task Force, IETF, CH, Feb. 13, 2005, pp. 1-39, XP015039521 ISSN: 0000-0004 paragraphs [4.1.]-[4.3.] paragraph [5.4.].

Ericsson: "PDN GW identification" 3GPP Draft; S2-083275 23.402_CR0263_PDN_GW Identity PA2, 3rd Generation Partnership Project (3GPP), Mobile Competence Centre ; 650, Route Des Lucioles ; F-06921 Sophia-Antipolis Cedex ; France,vol. SA WG2, No. Prague; 20080512,Apr. 30, 2008, XP050265506 Chapters 8.3 and 9.5; pp. 24-29.

International Search Report & Written Opinion—PCT/US2009/046518, International Search Authority—European Patent Office Apr. 9, 2009.

Jun Wang, "Access Authentication and Authorization in UMB", May 14, 2007, 3rd Generation Partnership Project 2 "3GPP2", pp. 1-3.

Stamoulis A et al.,"Space-Time Block-Coded OFDMA With Linear Precoding for Multirate Services" IEEE Transactions on Signal Processing, 20020101 IEEE Service Center, New York, NY, US, vol. 50,Nr:1,pp. 119-129, Jan. 2002, XP001200909.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8); ETSI TS 136 300" ETSI Standards, Lis, Sophia Antipolis Cedex, France, vol. 3-R2, No. V8.1. 0, Jun. 1, 2007, pp. 1-107, XP014038500 ISSN: 0000-0001 paragraph [8.2.] paragraphs [010.]-[10.2.2.].

"3GPP TR 23.882 v1.8.0 3GPP System Architecture Evolution: Report on Technical Options and Conclusions (Release 7)", Feb. 21, 2007, Retrieved from the Internet: http://www.3gpp.org/fpt/Specs/ html-info/23882.htm, XP002488584.

3GPP TSG-RAN WG2, "Generic approach for optimized non-3GPP handover", S2-073606 (Aug. 31, 2007).

Taiwan Search Report—TW098118946—TIPO—Oct. 5, 2012.

3GPP TS 23.402, "3rd Generation Partnership Project; Technical Specification Group Services and System Aspects; Architecture enhancements for non-3GPP accesses (Release 8)", V8.1.1, Mar. 2008, pp. 1-163.

3GPP TS 36.300 V8.0.0 (Mar. 2007); Evolved Universal Terrestrial Radio Access (E-UTRA) and Evolved Universal Terrestrial Radio Access Network (E-UTRAN) (Mar. 31, 2007).

* cited by examiner

METHOD AND APPARATUS FOR INTER-NETWORK HANDOFF

CLAIM OF PRIORITY UNDER 35 U.S.C. §119

The present Application for Patent claims priority to U.S. Provisional Application Ser. No. 61/059,677, filed Jun. 6, 2008, and entitled "METHOD, AND APPARATUS AND SYSTEM FOR HRPD TO LTE HANDOFF," and assigned to the assignee hereof and hereby expressly incorporated by reference herein.

BACKGROUND

I. Field

The present disclosure relates generally to wireless communications, and more specifically to techniques for managing handoff operations between wireless communication networks.

II. Background

Wireless communication networks can provide various communication services; for instance, voice, video, packet data, broadcast, messaging services, etc. These networks can be multiple-access networks capable of supporting communications for multiple terminals by sharing available network resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

Generally, a wireless multiple-access communication network can simultaneously support communications for multiple wireless terminals. In such a network, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) network.

As wireless communication technology becomes more advanced, seamless mobility and service continuity between different mobile networks, which can utilize dissimilar access methods from one another, becomes increasingly important. Seamless mobility among dissimilarly-accessed networks can be facilitated by prepared handoffs among networks. Such handoffs can be enabled through inter-access system preparation. Various techniques exist for providing handoff preparation across networks. For example, inter-network preparation can be conducted by access terminals enabled to communicate on two radio technologies simultaneously. However, conducting network preparation in this manner prevents the use of low-cost terminal hardware with multi-mode radio capability. Alternatively, an interface between mobility management entities of dissimilarly-accessed networks can be provided such that a first network can utilize the interface to prepare resources at a second network. However, such technique requires different radio technologies to be able to communicate with one another, it necessarily requires a complex standardization effort among the different radio technologies. Furthermore, such standardization, if at all possible, may not be practical among the already deployed networks.

Accordingly, there exists a need for techniques for a system supporting improved inter-network handoffs between wireless communication networks.

DETAILED DESCRIPTION

Figure 1:
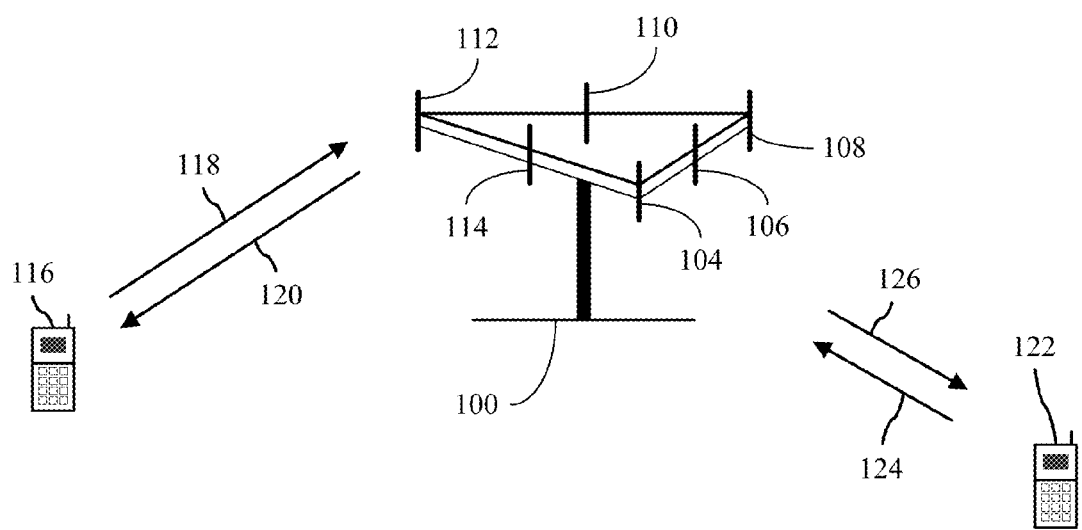
FIG. 1 illustrates a wireless multiple-access communication system in accordance with various aspects set forth herein.

Various aspects of the claimed subject matter are now described with reference to the drawings, wherein like reference numerals are used to refer to like parts. In the following description, for purposes of explanation, particular details are set forth in order to provide a thorough understanding in some aspects. It may be evident, however, that those aspects may be practiced without these specific details. In other instances, well known structures and processes are not elaborated in order not to obscure the description of the invention with unnecessary details.

As used in this application, the terms "component," "module," "system" and the like are intended to refer to a computer-related entity, either hardware, firmware, software, and a combination of hardware and software. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a PDA, a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication networks, such as Code Division Multiple Access (CDMA) networks, Time Division Multiple Access (TDMA) networks, Frequency Division Multiple Access (FDMA) networks, Orthogonal Frequency Division Multiple Access (OFDMA) networks, Single Carrier FDMA (SC-FDMA) networks, and other such networks. The terms "system" and "network" are often used herein interchangeably. A CDMA network can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an exemplary wireless multiple-access communication network. In the network, there is an access point 100 (AP) which includes multiple antenna groups. As illustrated in FIG. 1, one antenna group can include antennas 104 and 106, another can include antennas 108 and 110, and still another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
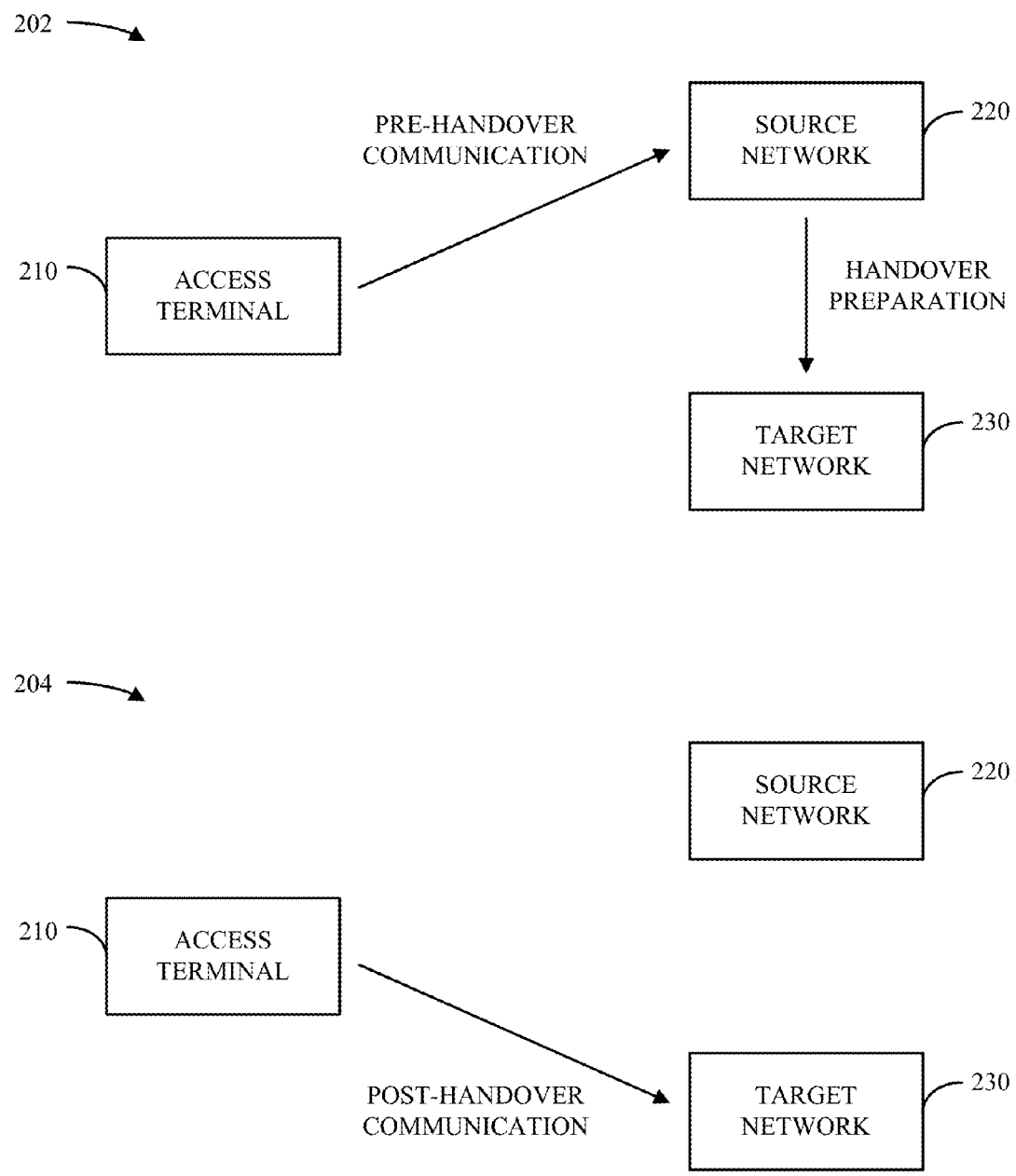
FIG. 2 is a block diagram that illustrates an exemplary prepared handoff operation in a wireless communication system.

FIG. 2 is a block diagram that illustrates an example prepared handoff operation between wireless communications networks. In one example, a handoff can be conducted to transfer communication service for an access terminal 210 from a source network 220 to a target network 230, as illustrated by diagrams 202 and 204. Further, source network 220 and target network 230 can utilize the same radio access technology or different technologies.

In accordance with one aspect, in the event that source network 220 and target network 230 utilize different radio technologies, an inter-network system handoff from source network 220 to target network 230 can be conducted without inter-network system preparation (e.g., basic handoff) or with inter-network system preparation (e.g., prepared handoff). A non-limiting example of a prepared handoff from source network 220 to target network is illustrated by diagrams 202 and 204.

Diagram 202 illustrates communication in an example wireless communication system prior to a handoff from source network 220 to target network 230 in accordance with one aspect. As shown in diagram 202, an access terminal 210 for which the handoff is to be conducted can conduct pre-handoff communication with source network 220. Further, source network 220 can communicate information for handoff preparation to target network 230. While not illustrated in diagram 202, it should be appreciated that access terminal 210 can additionally and/or alternatively provide handoff preparation information directly to target network 230. Upon handoff preparation, a handoff can be conducted from source network 220 to target network 230 such that access terminal 210 can conduct post-handoff communication with target network 230 as illustrated in diagram 204.

Various techniques exist for inter-network system handoff preparation of a target network 230. As a first example, an access terminal 210 can be provided with "dual radio" capabilities such that, for example, the access terminal 210 is able to communicate with the source network 220 and target network 230 simultaneously. In such an example, the access terminal 210 can prepare authentication, authorization, and accounting (AAA) functions, setup of resources, and/or other aspects of a handoff for a target network 230 utilizing the radio interface of the target network 230 before dropping the radio link to the source network 220. In this manner, service interruption time can be minimized upon handing over user sessions from the source network 220 to the target network 230. However, because this approach relies on dual-radio capability for an access terminal 210, it prevents the use of low-cost terminal hardware without multi-mode radio capability.

As another example, an interface can be provided between network infrastructure elements of the two networks 220 and 230 involved in the handoff to push information relating to an access terminal 210 and its sessions from the source network 220 to the target network 230. As a result, when the access terminal 210 subsequently drops the radio link with the source network 220 and connects to the target network 230, the target network 230 can already be prepared to continue the sessions of the access terminal 210. This approach is employed, for example, for handoff operations between 3GPP second generation (2G) and third generation (3G) legacy networks. However, it can be appreciated that this approach requires nodes of two dissimilar networks 220 and 230, each of which may utilize a different standard generation and/or technology for communications, to communicate information to each other. Accordingly, such an approach requires a substantial standardization effort between the involved networks 220 and 230 and results in a major design impact on both networks 220 and 230. It can be appreciated that this drawback is even more significant when the two involved networks 220 and 230 are regulated by different standards organizations (e.g. by 3GPP, 3GPP2, WiMAX Forum, IEEE, etc.).

In view of the foregoing, the description below provides techniques for inter-network system handoff that mitigate at least the above shortcomings. In accordance with one aspect, handoff techniques are provided that enable a target network 230 to be prepared by an access terminal 210 via a source network 220 in order to minimize specific changes required to source network 220 and/or target network 230.

Figure 3:
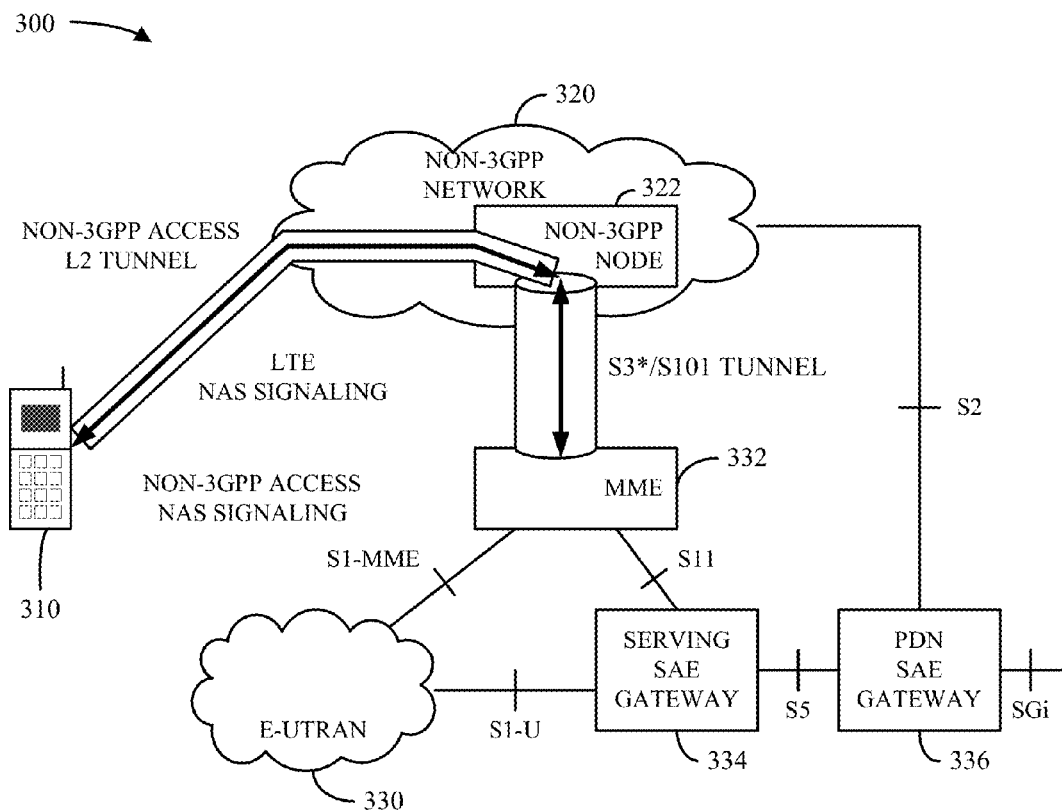
FIGS. 3-5C are block diagrams that illustrate respective systems for inter-network handoff in a wireless communication system.

FIG. 3 is a block diagram that illustrates an exemplary system 300 for inter-network system handoff. In this example, system 300 can be utilized to provide inter-network system handoff for a "single radio" access terminal 310 (e.g., a terminal capable to communicate and/or to be in an active state with a single radio system at a time). In accordance with one aspect, system 300 utilizes the radio link of a source system for a handoff operation to "tunnel" signaling messages which are in the format understood by a destination node in the target network. For example, the signaling messages can be transmitted in a format that would be utilized for sending the messages directly to the target network.

In the system 300, it is shown that a handoff operation can be conducted between an Evolved Universal Terrestrial Radio Access Network (E-UTRAN) 330 based on LTE access technology and a non-3GPP network 320 (e.g., a 3GGP2 High-Rate Packet Data (HRPD) network). It should be appreciated that system 300 can facilitate a handoff operation from the non-3GPP network 320 to the E-UTRAN network 330. Further, it should be appreciated that, while an E-UTRAN network 330 and a non-3GPP network 320 are illustrated in system 300, the techniques illustrated by system 300 can be applied to network(s) based on any suitable wireless communication technology.

In this example, system 300 can provide inter-network system handoff by establishing a simple generic transmission tunnel between the network nodes in the two dissimilar systems which handle intra-system mobility and provide a Layer 2 (L2) tunneling mechanism over the radio interface of each involved network technology. In the example illustrated by system 300, the generic transmission tunnel can be provided between a Mobility Management Entity (MME) 332 associated with E-UTRAN network 330 and a non-3GPP network node 322 (e.g., a cdma2000 base station controller or BSC) at non-3GPP network 320 over a S3* or S101 reference point. As further illustrated by system 300, E-UTRAN network 330, MME 332, and/or non-3GPP network 320 can additionally communicate with a serving System Architecture Evolution (SAE) gateway 334 and/or a Packet Data Network (PDN) SAE gateway 336 through various interfaces therebetween. In accordance with one aspect, the tunneling mechanisms provided by system 300 for a single-radio access terminal 310 can achieve handoff performance traditionally associated with dual-radio terminals while minimizing the impact on the two networks 320 and 330 involved in the handoff.

In this example, L2 tunneling can be provided within system 300 for delivery of signaling from an access terminal 310 directly to a non-3GPP network node 322 in a non-3GPP network 320, a MME 332 associated with E-UTRAN network 330, and/or another suitable network node responsible for mobility within an associated network. Alternatively, L2 tunneling can be provided in multiple segments such that, for example, a first L2 tunnel is utilized to provide signaling between access terminal 310 and non-3GPP network 320 and a second L2 tunnel is utilized to provide data from a network 320 to a respective network node 322.

Additionally, tunneling between network node 322 over the S3* or S101 reference point can be conducted in various manners. For example, handoff preparation information for a target network can be provided from access terminal 310 to a source network. The source network can then relay the handoff preparation information to the target network over the S3* or S101 tunnel using a specifically-constructed protocol that is independent of radio access technologies utilized by the source and/or target networks. Alternatively, access terminal 310 can communicate handoff preparation information for a target network to a source network as user data, which can then be relayed to the target network by the source network utilizing IP connectivity provided by the source network.

In accordance with one aspect, system 300 can be utilized to facilitate inter-network system handoff for a single-radio terminal that achieves handoff performance in terms of delay that is approximately the same as that for dual-radio terminals. In addition, it can be appreciated that the handoff techniques illustrated by system 300 require only support for generic transmission tunnels. These tunnels include, for example, L2 tunnels between an access terminal 310 and mobility management entity 322 in the corresponding network infrastructure (e.g., a BSC in a 3GPP2 HRPD system, a Serving Generic Packet Radio Service (GPRS) Support Node (SGSN) SGSN in 3GPP legacy systems for 3GPP Release 8 (Rel-8) or pre-Rel-8, a MME in 3GPP Rel-8, etc.) and/or a generic IP packet transport tunnel between the corresponding mobility management entities of the two involved networks. It should be noted that support for an L2 tunnel between access terminal 310 and non-3GPP network 320 results in modifications to the L2 layers in both the access terminal 310 and the non-3GPPP access network 320. Accordingly, modification to deployed networks should be desirably minimized. Accordingly, the variously describe aspects utilizing L3 tunneling enable the usage of already deployed HRPD air interfaces as well as an already defined LTE architecture by translating between a signaling access interface of an non-3GPP (HRPD) network and a signaling access interface of an E-UTRAN (LET) network.

Figure 4:
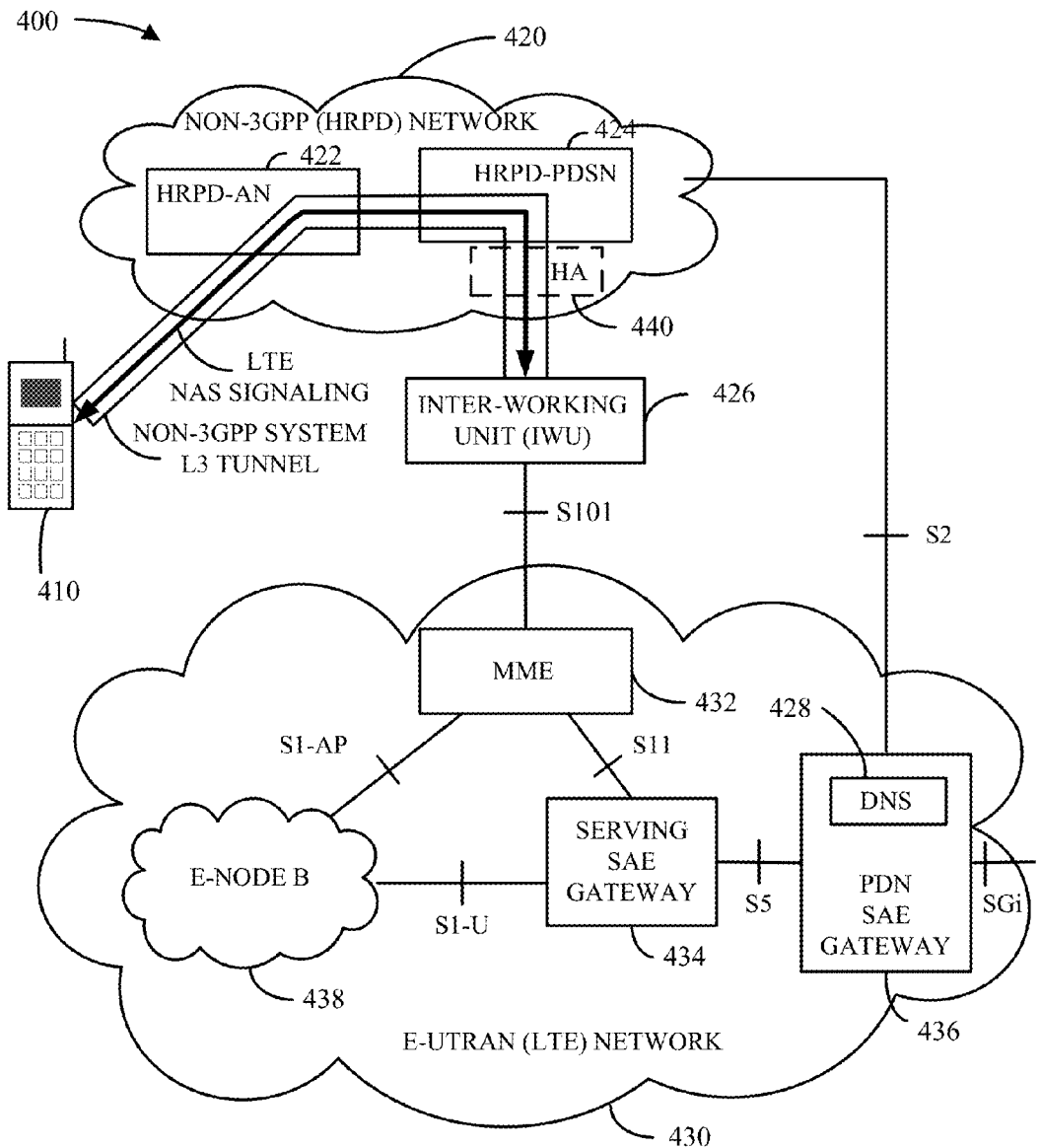

With reference now to FIG. 4, a diagram of a system 400 is provided that illustrates exemplary resource preparation initiated by an access terminal 410 for a handoff from a non-3GPP network 420 to an E-UTRAN network 430. As illustrated by system 400, when access terminal 410 is connected with a non-3GPP network 420 and handoff preparation toward an E-UTRAN network 430 is triggered, LTE Non-Access Stratum (NAS) signaling messages can be exchanged between access terminal 410 and an MME 432 associated with E-UTRAN network 430 via a non-3GPP L3 tunnel from access terminal 410 to an interworking unit (IWU) 426 via non-3GPP network 420. Non-3GPP network 420 may further include radio and data elements including an access node (HRPD-AN) 422 and packet data serving node (HRPD-PDSN) 424.

In one example, L3 tunneling can be conducted directly from access terminal 410 to IWU 426 or as a series of L3 tunnels from access terminal 410 to non-3GPP network 420 and from non-3GPP access network 420 to IWU 426. In accordance with one aspect, NAS signaling messages are transparently transported by non-3GPP network 420 through the L3 tunnel toward E-UTRAN network 430 via an IWU 426 located between the non-3GPP network 420 toward E-UTRAN network 430. The L3 tunneling may couple with the IWU 426 through one or more various non-3GPP network elements including access node (HRPD-AN) 422, packet data serving node (HRPD-PDSN) 424 and optionally, in a "non-breakout" configuration, through a home agent 440. Further, an S101 reference point connects IWU 426 with the MME 432 associated with E-UTRAN network 430. Since IWU 426 engages in interpreting handoff messages directed to the target network, non-3GPP network 420 is not required to interpret messages directed to E-UTRAN network 430, thereby limiting the impact to either network 420 or 430.

IWU 426 represents a programmed node on an addressable data network for providing a secure tunneling interface between access terminal 410 and the E-UTRAN network 430. In one embodiment, IWU 426 converts signaling between the S101 interface of MME 432 of E-UTRAN network 430 by supporting DirectTransfer messages, handoff messages and S101 session ID management. Furthermore, IWU 426 may also convert the S101 messages to UDP/IP message encapsulation format. By way of example, a new protocol is defined to add a header identifying MME 432 to the NAS signaling messages for delivery to IWU 426.

Implementation of an IWU 426 for providing NAS signaling messages transparently transported by non-3GPP network 420 toward E-UTRAN network 430 includes the addition of identifiers appended by access terminal 410 to NAS messages which allow the MME 432 to identify the NAS messages. Furthermore, IWU 426 is configured to implement S101 session ID mapping to access terminal 410 the access terminal specific identifier. Specifically, IWU 426 maps from an IP address to S101 session ID for reverse link messages and maps from S101 session ID to IP address for forward link messages. IWU 426 further provides S101-AP of IWU with the information required for S101-AP signaling (e.g. status, which MME is used to get from AN directly). Further, IWU 426 may be configured to assist in the delivery of non-NAS information (e.g., LTE neighbor list, LTE measurement reports, etc.) between MME 432 and access terminal 410 that would otherwise require a further modified interface at non-3GPP network.

As FIG. 4 further illustrates, handoff can be further facilitated by an e-node B (base station) 438, a serving SAE gateway 434 and/or a PDN SAE gateway 436. For example, PDN SAE gateway 436 may support a public IP address service such as by supporting a domain name system (DNS) 428 for identifying the IP address of IWU 426.

Figure 5A:
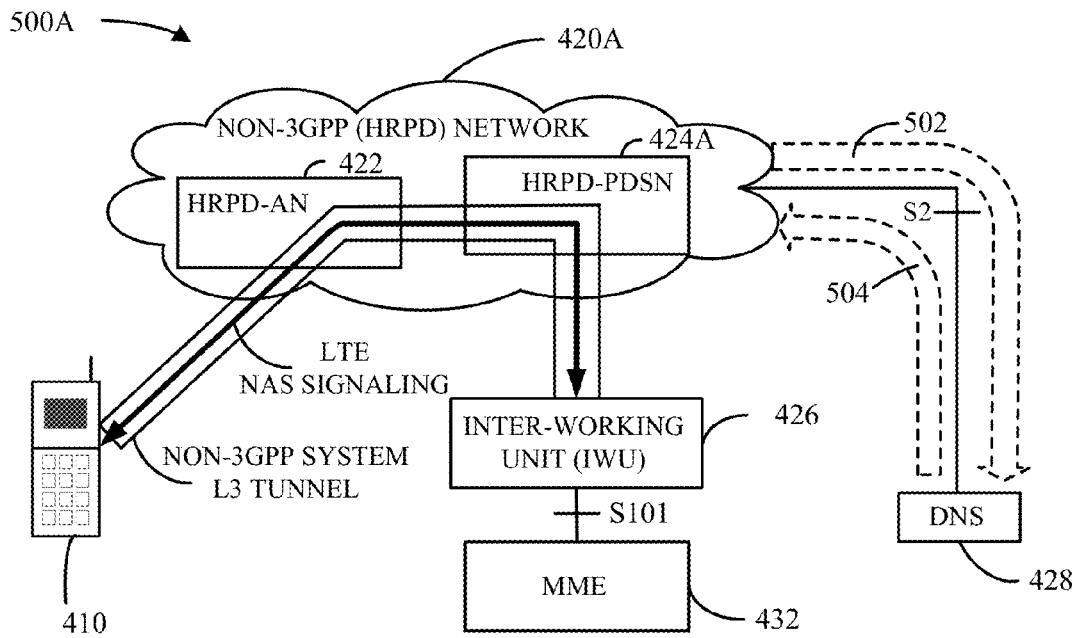
Figure 5B:
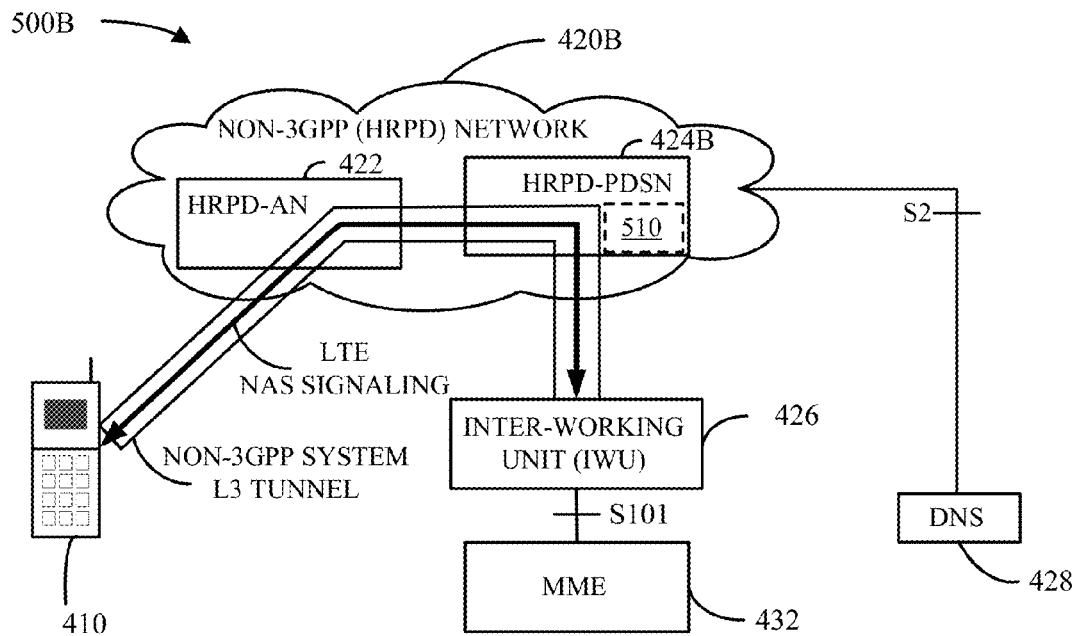
Figure 5C:
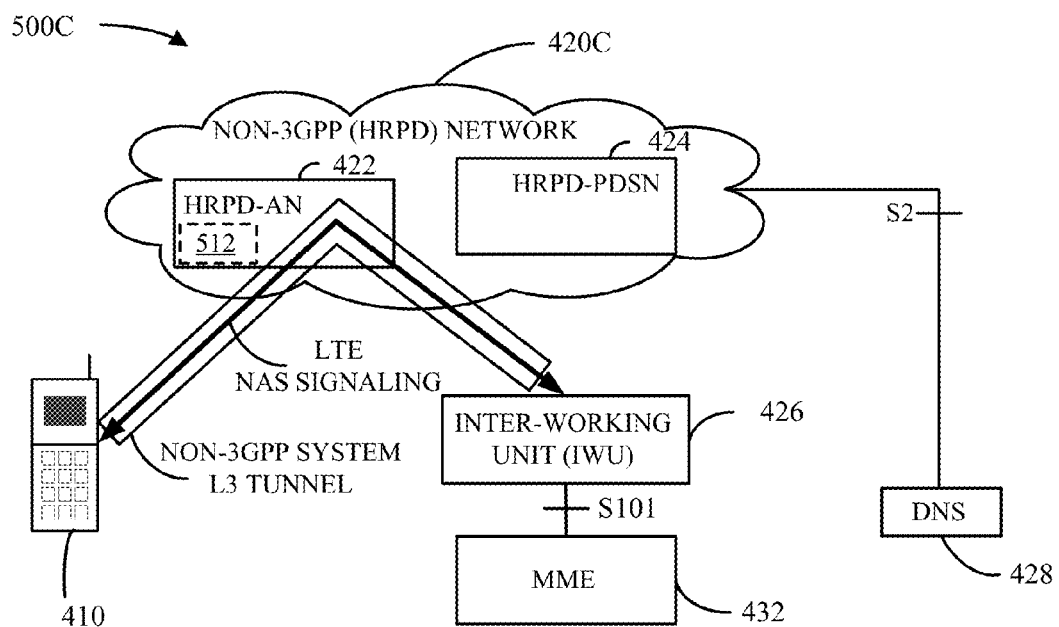

FIGS. 5A-5C illustrate interworking-unit access, according to various aspects. Since the IWU 426 is an addressable entity on the data network, various aspects are disclosed to provide an address (IP address) of the IWU 426 for formation of the L3 tunnel between the access terminal 410 and the IWU 426. FIG. 5A illustrates an aspect where the IP address of IWU 426 is a public address and is discovered through the data elements of the non-3GPP network 420 using a domain name service (DNS) 428. The non-3GPP network 420 obtains the IP address of IWU 426 according to signal flows 502, 504 and then utilizes the IWU IP address for L3 tunneling of the NAS signaling between the access terminal 410 and the IWU 426.

FIG. 5B illustrates another aspect where L3 tunneling between access terminal 410 and IWU 426 utilizes a special or dedicated IP address 510 stored within HRPD-PDSN 424B wherein the L3 tunneling is facilitated by a "breakout" between HRPD-PDSN 424B and IWU 426 due to the IWU IP address being retained locally at HRPD-PDSN 424B. Accordingly, NAS signaling passes in data packets directly between HRPD-PDSN 424B and IWU 426.

FIG. 5C illustrates yet another aspect where L3 tunneling between access terminal 410 and IWU 426 utilizes a physical path for tunneling of NAS signaling using an HRPD-AN 422 to IWU 426 direct interface. In the present aspect, HRPD-AN 422 directly forwards data packets including NAS signaling to IWU 426 while circumventing the HRPD-PDSN 424.

Figure 6:
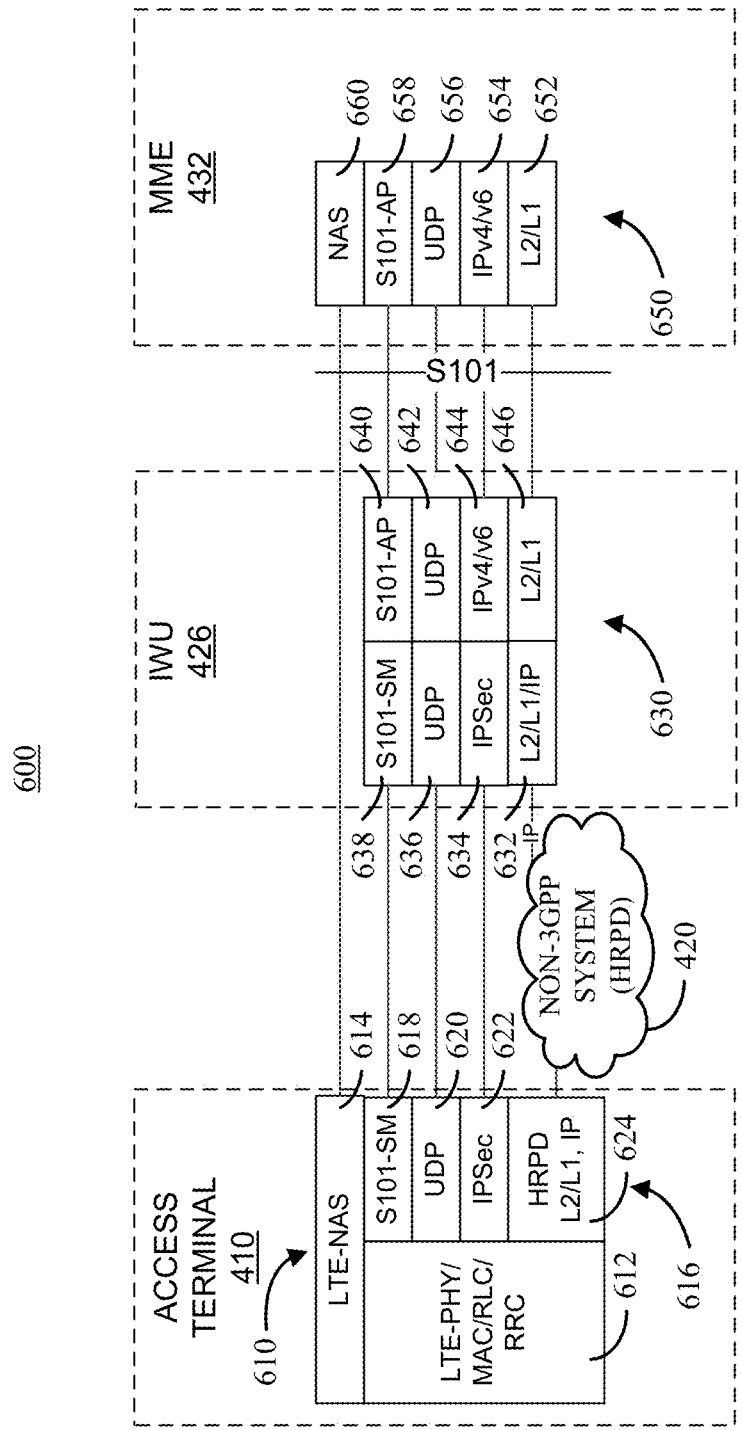
FIG. 6 illustrates an exemplary system protocol architecture that can be utilized to facilitate inter-network handoffs.

FIG. 6 illustrates protocol stacks relating to each of the elements according to the various aspects. Protocol stacks for system 600 include access terminal protocol stacks 610, IWU protocol stacks 630 and MME protocol stacks 650. Access terminal protocol stack 610 includes an LTE protocol stack 612 for communication with E-UTRAN network 430 following the handoff. An exemplary LTE protocol stack 612 includes a physical layer PHY, a MAC layer, an RLC layer and Radio Resource Control (RRC) layer. Access terminal protocol stack 610 further includes an application layer configured as a Non Access Stratum (NAS) signaling layer 614.

Access terminal protocol stack 610 further includes an HRPD protocol stack 616 for communication with the non-3GPP (HRPD) network 420. An exemplary HRPD protocol stack 616 also includes NAS signaling layer 614 for generating signaling messages for handoff preparation signaling with E-UTRAN (LTE) network 430 via the tunneling described above. HRPD protocol stack 616 further includes a Session Manager (SM) session layer 618 including a defined S101-SM protocol. S101-SM protocol in the access terminal protocol stack 610 functions by adding header information used by IWU 426 to select the MME 432 and to create S101

Direct Transfer Messages. Session layer 618 interfaces with a transport layer 620, a network layer 622 and link and physical HRPD L2/L1 layer 624 which may be an L2 link layer implemented with Point-to-Point Protocol (PPP) over Radio Link Protocol (RLP). Access terminal 410 may maintain a PPP session with HRPD-PDSN 424 and may exchange data with non-3GPP network 420 via RLP. A data session may comprise a PPP session in HRPD. Network layer 622 may be configured according to Internet Protocol (IP) and a transport layer 620 may be configured, for example, according to a User Datagram Protocol (UDP) or other protocol such as Transmission Control Protocol (TCP). Non-3GPP (HRPD) network 420 facilitates communication between access terminal 410 and IWU 426.

System 600 further includes an IWU 426 including an IWU protocol stack 630. IWU protocol stack 630 includes corresponding protocol layers for interacting with the non-3GPP network. Specifically, IWU protocol stack 630 includes a HRPD L2/L1 layer 632 which may be an L2 link layer implemented with Point-to-Point Protocol (PPP) over Radio Link Protocol (RLP). IWU 426 may maintain a PPP session with HRPD-PDSN 424 and may exchange data with non-3GPP network 420 via RLP. A data session may comprise a PPP session in HRPD. IWU protocol stack 630 further includes a network layer 634 configured according to Internet Protocol (IP) and a transport layer 636 may be configured, for example, according to a User Datagram Protocol (UDP) or other protocol such as Transmission Control Protocol (TCP). The network layer 634 and transport layer 636 enable respective peer communication with network layer 622 and transport layer 620 in the access terminal protocol stack 610 of access terminal 410.

IWU protocol stack 630 further includes a Session Manager (SM) session layer 638 including the defined S101-SM protocol. S101-SM protocol in the IWU stack 630 functions by receiving the header information inserted by the access terminal session layer 618 to be used by IWU 426 to select the MME 432 and to pass S101 Direct Transfer Messages. IWU protocol stack 630 further includes corresponding protocol layers for interacting with the E-UTRAN network 430 by way of the MME 432 including a session layer 640 configured as S101-AP protocol. Specifically, IWU 426 uses the header information in the S101-SM message to select the MME 432 and passes the necessary information to session layer 640 configured according to S101-AP protocol.

IWU protocol stack 630 further includes transport layer 642 interfacing with a network layer 644 and L2/L1 layer 646 which may be an S101 interface. Transport layer 642 may be configured according to a User Datagram Protocol (UDP) or other protocol such as Transmission Control Protocol (TCP) and network layer 644 may be configured according to Internet Protocol (IP) v4/v6.

System 600 further includes an MME 432 including an MME protocol stack 650. MME protocol stack 650 includes corresponding protocol layers for interacting with the IWU 426. Specifically, MME protocol stack 650 includes an L2/L1 layer 652 which may be an L2 link layer and an L1 physical layer implemented according to S101 protocol. MME protocol stack 650 further includes a network layer 654 configured according to Internet Protocol (IP), for example Dual Stack Mobile IP v4/v6, and a transport layer 656 may be configured, for example, according to a User Datagram Protocol (UDP) or other protocol such as Transmission Control Protocol (TCP). The network layer 654 and transport layer 656 enable respective peer communication with network layer 644 and transport layer 642 in the IWU protocol stack 630 of IWU 426.

MME protocol stack 650 further includes a session layer 658 including the defined S101-AP protocol. S101-AP protocol in the MME protocol stack 650 functions by receiving the S101 signaling information inserted by the IWU session layer 640 to be used by MME 432 to pass S101 Direct Transfer Messages to other elements of E-UTRAN network 430. MME protocol stack 650 further includes an application layer 660 configured as a Non Access Stratum (NAS) signaling layer for providing a peer interaction with the application layer (NAS signaling layer) 614 of the access terminal protocol stack 610 in access terminal 410.

As illustrated above with reference to FIGS. 4-6, example systems 400, 500 and 600 are illustrated that can be utilized to facilitate inter-network system handoff in accordance with various aspects. In one example, resource preparation for a handoff between a non-3GPP network 420 and an E-UTRAN network 430 can be accomplished by employing a logical interface between the networks 420 and 430 by way a translating or converting entity illustrated herein as IWU 426. It can be appreciated that handoff preparation can be carried out over a first reference point established between a non-3GPP network 420 and an IWU 426 denoted as a reference point L3 tunnel via IP and a second reference point established between IWU 426 and a E-UTRAN system network 430 denoted as a reference point S101.

In accordance with one aspect, various network entities can additionally and/or alternatively communicate with each other over a set of reference points therebetween. For example, as illustrated by system 400, MME 432 can communicate with a serving SAE gateway 434 over an S11 reference point. In turn, serving SAE gateway 434 can communicate with a PDN SAE gateway 436 over an S5 reference point (in the case of a non-roaming architecture). PDN SAE gateway 436 and/or serving SAE gateway 434 can additionally and/or alternatively communicate with one or more external packet data networks via an SGi reference point.

Figure 7:
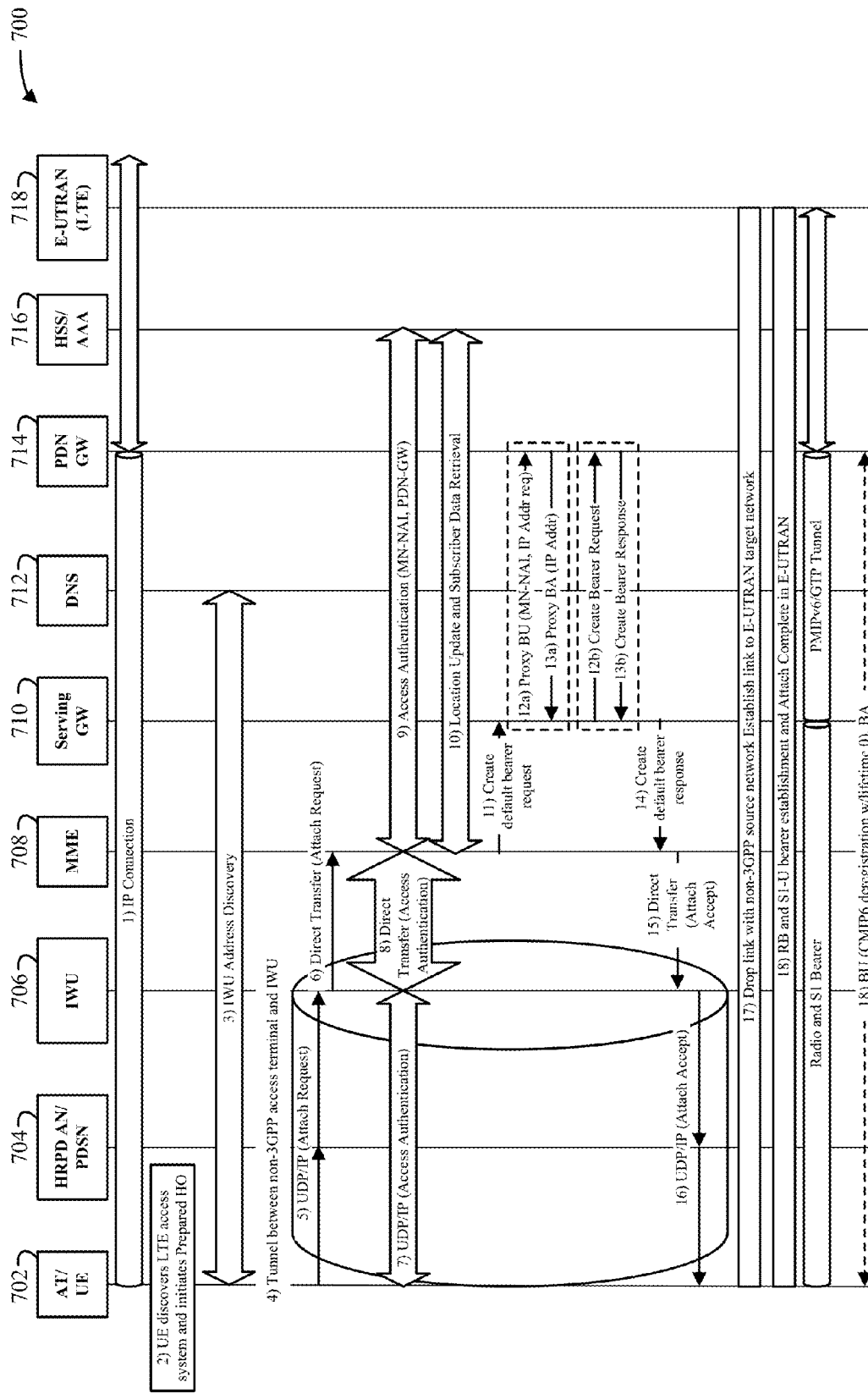
FIG. 7 illustrates respective exemplary handoff procedures that can be performed in a wireless communication system.

FIG. 7 is a diagram that illustrates an example handoff procedure that can be performed in a wireless communication system in accordance with various aspects. More particularly, diagram 700 illustrates a prepared handoff from trusted non-3GPP IP access network with an IP connection (e.g., Dual Stack Mobile IP Version 6 (DSMIPv6) over an S2c reference point) to a 3GPP access network in a non-roaming scenario. It should be appreciated, however, that diagram 700 is provided by way of specific example and is not intended to limit the scope of the hereto appended claims.

In accordance with one aspect, a communication session illustrated by diagram 700 begins in a trusted non-3GPP network (e.g., a 3GPP2 HRPD network) using DSMIPv6 in a non-roaming scenario. Subsequently, the session hands over to a E-UTRAN (LTE) network by means of a prepared handoff. Accordingly, at time 1 on diagram 700, an access terminal 702 is active and utilizes a trusted non-3GPP (HRPD) network 704. In addition, the access terminal 702 has a DSMIPv6 session with a PDN GW 714. Next, at time 2, the access terminal 702 discovers an E-UTRAN (LTE) network 718 and initiates a prepared handoff from the currently used trusted non-3GPP (HRPD) network 704 to the discovered E-UTRAN (LTE) network 718.

Next, at time 3, the access terminal 702 performs an address discover request with DNS 712 to identify an IP address for IWU 706. It should be noted that other aspects described above utilize stored addresses of IWU 706 which would not require the execution of the address discovery at time 3. Upon initiation of the prepared handoff at time 2 and address discovery at time 3 of an IP address of IWU 706, if necessary, a tunnel between the non-3GPP network 704 and an IWU 706 is created or otherwise identified at time 4. Next, at time 5, the access terminal 702 sends an Attach Request message encapsulated in Session Manager S101-SM protocol described above over non-3GPP network 704, which is routed via the tunnel to the IWU 706. At a time 6, the Attach Request message is forwarded using a Direct Transfer message according to S101 protocol from IWU 706 to MME 708 of the E-UTRAN (LTE) network. At times 7-9, access terminal 702 via IWU 706 and the MME 708 then contact the home subscriber server (HSS)/3GPP AAA 716 and authenticates the access terminal 702. In one example, as part of the authentication procedure, the IP address of the PDN GW 714 that needs to be used in E-UTRAN (LTE) network 718 is conveyed to the MME 708. Following successful authentication, the MME 708 performs a location update procedure with HSS 716 at time 10. Next, at time 11, the MME 708 selects a Serving GW 710 and sends a Create Default Bearer Request (including an International Mobile Subscriber Identity (IMSI), a MME Context ID, and a PDN GW IP address) to the selected Serving GW 710.

Following the Create Default Bearer Request at time 11, operation at times 12 and 13 can vary depending on system implementation. For example, for an Internet Engineering Task Force (IETF) implementation, the Serving GW 710 initiates the PMIPv6 registration procedure towards the PDN GW 714 at time 12 by sending a Proxy Binding Update (BU). In one example, if the Network Access Identifier (NAI) of the access terminal 702 is not provided in the location update procedure at time 10, the Serving GW 710 can derive it at time 12. At time 13, the PDN GW 714 can then respond with a Proxy Binding Acknowledgement (Ack) and update its mobility binding, which effectively switches the DSMIPv6 tunnel from the non-3GPP network 704 to the PMIPv6 tunnel to the Serving GW 710. In the proxy Binding Ack (BA), the PDN GW 714 can include the same IP address or prefix that was assigned to the access terminal 702 earlier. Alternatively, for a GPRS Tunneling Protocol (GTP) implementation, the Serving GW 710 can provide a Create Bearer Request message to the PDN GW 714 at time 12. Subsequently, the PDN GW 714 can respond at time 13 with a Create Bearer Response message to the Serving GW 710. In one example, the Create Bearer Response contains the same IP address or prefix that was assigned to the access terminal 702 earlier.

Following the acts performed at times 12 and 13, the Serving GW 710 can return a Create Default Bearer Response message to the MME 708 at time 14. In one example, this message can also include the IP address of the access terminal 702. Further, this message can serve as an indication to the MME 708 that the binding has been successful. Next, at time 15, MME 708 sends Attach Accept message using Direct Transfer to IWU 706. Next, at time 16, the IWU 706 sends the Attach Accept message using UDP/IP protocol to access terminal 702 through the tunnel between the IWU 706 and the non-3GPP network 704. At time 17, the access terminal 702 then drops the link with the non-3GPP network 704 and establishes a link with the E-UTRAN target network 718. At time 18, the E-UTRAN (LTE) network 718 can then initiate a radio bearer setup procedure. In response, the E-UTRAN network 718 can provide an Attach Complete message. Upon completing the acts described at time 18, handoff completes. Following handoff, the access terminal 702 can optionally additionally send a BU to the PDN GW 714 at time 18 to de-register its DSMIPv6 binding that was created while the access terminal 702 was in the non-3GPP network 704.

Figure 8:
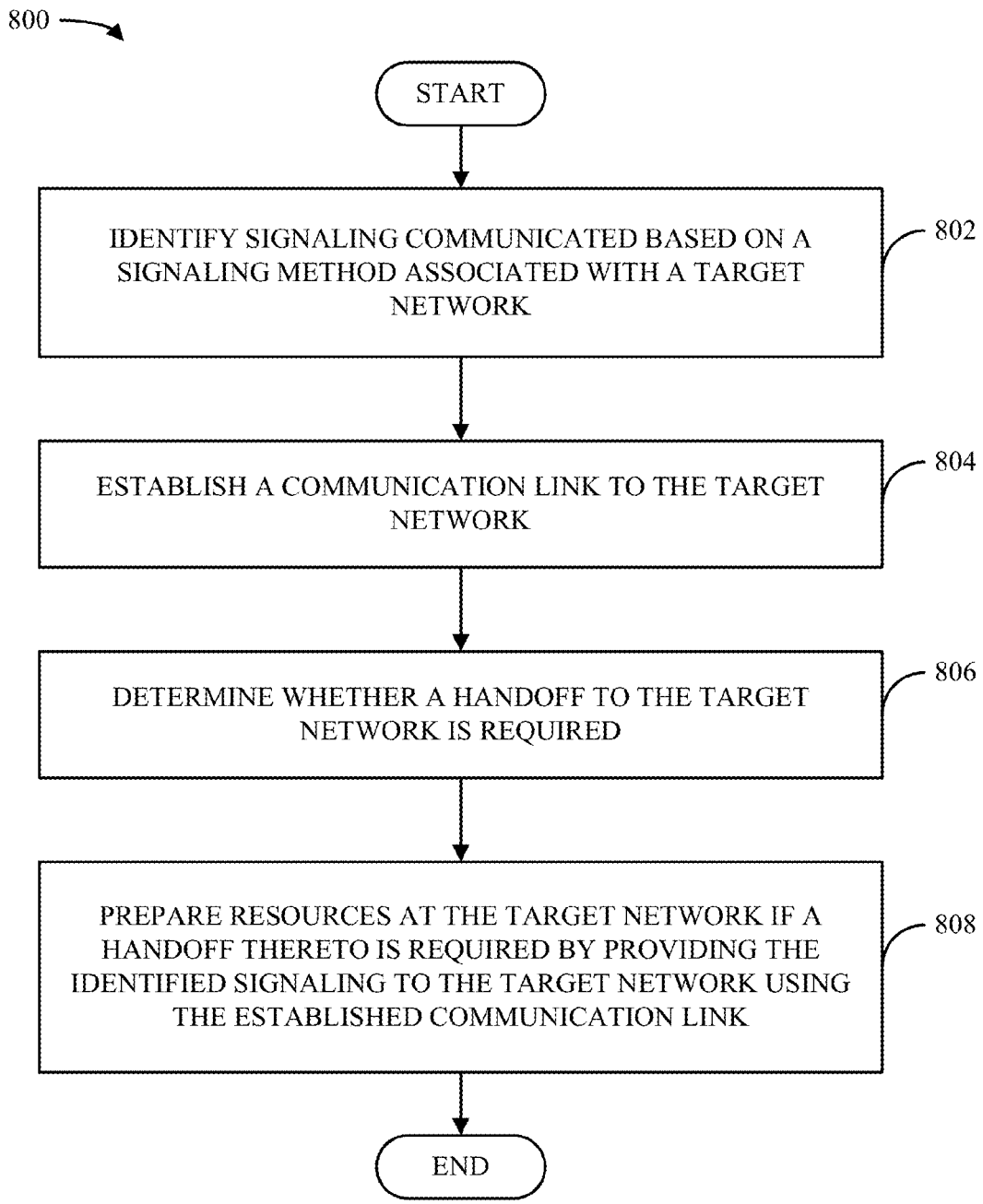
FIGS. 8-10 are flow diagrams of respective methods for performing inter-network prepared handoffs.
Figure 9:
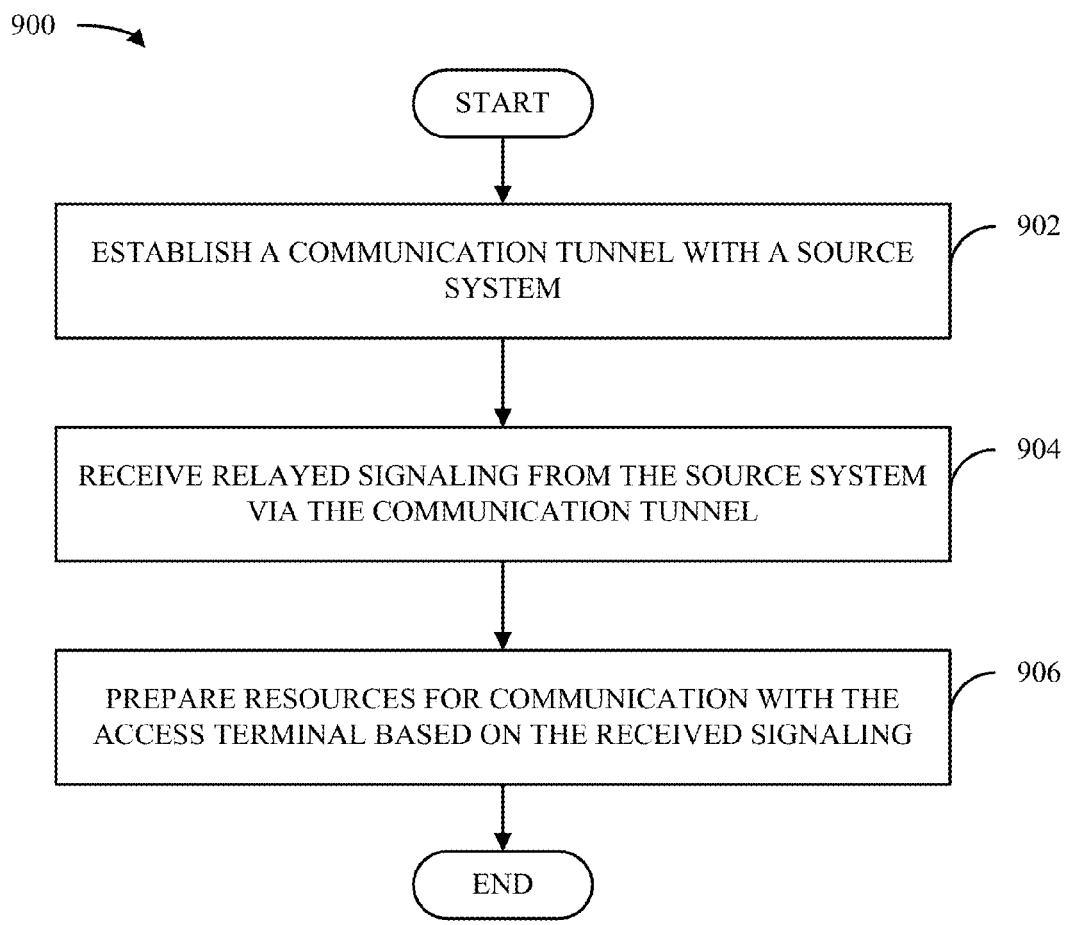
Figure 10:
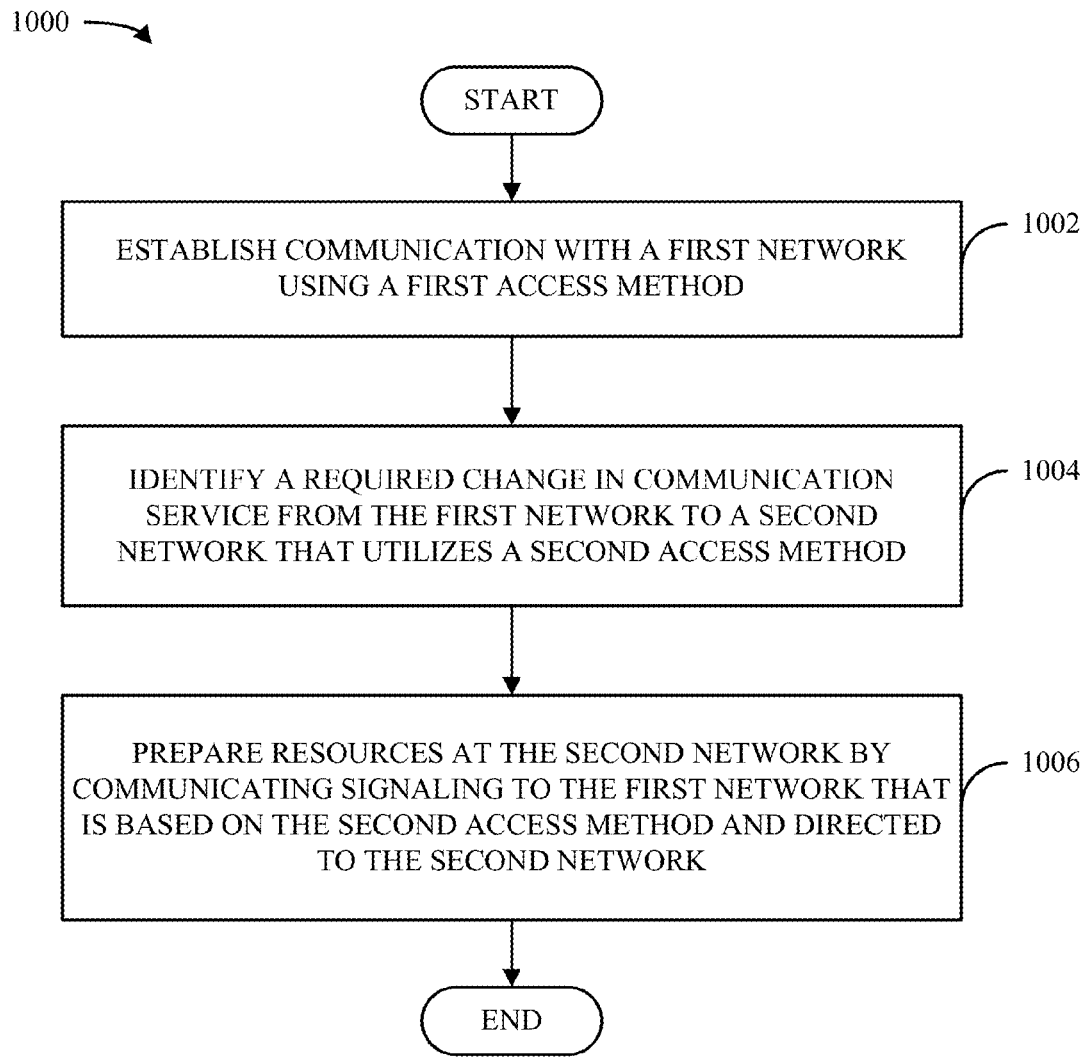

Referring to FIGS. 8-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for managing a handoff to a target network (e.g., target network 230) in a wireless communication system (e.g., system 400, 500, 600 and 700). It is to be appreciated that methodology 800 can be performed by, for example, a wireless communication network (e.g., source network 220) and/or any other appropriate network entity. Methodology 800 begins at block 802, wherein signaling (e.g., signaling communicated from an access terminal 210) based on a signaling method associated with a target network (e.g., target network 230) is identified. In one example, the signaling method utilized for the signaling at block 802 can be based on a radio access technique of the target (e.g., LTE, cdma2000, etc.). The signaling can be communicated as NAS messages, as one or more encapsulated data packets, and/or in any other suitable structure.

Next, at block 804, a communication link to the target network is established. The communication link can be established over an IP reference point and/or any other suitable reference point. In one example, the communication link is translated by an IWU communicating according to a source protocol stack with the source network forming a signaling tunnel therebetween and according to a target protocol stack with the target network as can terminated at an MME and/or another suitable network node at the target network. The communication link can additionally utilize an access-independent protocol; for example, the link can be constructed as a generic IP packet transport tunnel. Methodology 800 can then proceed to block 806, wherein it is determined whether a handoff to the target network is required. In one example, establishment of a communication link to the target network at block 804 can be deferred until a positive determination is reached at block 806.

Methodology 800 can then conclude at block 808, wherein resources are prepared at the target network if a handoff thereto is required by providing the signaling identified at block 802 to the target network using the communication link established at block 804. In accordance with one aspect, the signaling can be provided to the target network transparently without requiring interpretation and/or other processing of the signaling to be performed beforehand. In one example, if signaling is identified at block 802 as one or more data packets, the signaling can be provided to the target network at block 808 using an IP transport protocol via the IWU 426.

FIG. 9 illustrates a methodology 900 for preparing resources for a handoff operation in a wireless communication system. Methodology 900 can be performed by, for example, a wireless communication network (e.g. target network 230) and/or any other appropriate network entity. Methodology 900 begins at block 902, wherein a communication tunnel is established between a source system and an IWU. In accordance with one aspect, the communication tunnel can be based on an access-independent protocol. For example, the communication tunnel can be a generic IP transport tunnel from the source system to the IWU and/or another suitable network node.

Next, at block 904, relayed signaling (e.g., signaling initially communicated by an access terminal) is received at the IWU from the source system via the communication tunnel established at block 902. In one example, relayed signaling received at block 904 can be based on a radio access technology utilized by an entity performing methodology 900 notwithstanding a radio access technology employed by the source system. Methodology 900 can then conclude at block 906, wherein resources for communication are prepared based on the signaling received at block 904.

FIG. 10 is a flow diagram that illustrates a methodology 1000 for preparing a handoff from a first network (e.g., source network 220) to a second network (e.g., target network 230). It is to be appreciated that methodology 1000 can be performed by, for example, an access terminal (e.g., access terminal 210) and/or any other appropriate network entity. Methodology 1000 begins at block 1002, wherein communication is established with a first network using a first access method. Next, at block 1004, a required change in communication service from the first network to a second network that utilizes a second access method is identified. In one example, the first and second access methods can be dissimilar from one another. For example, the first access method can be based on a non-3GPP network and the second access method can be based on an E-UTRAN (LTE) network.

Methodology 1000 can then conclude at block 1006, wherein resources are prepared at the second network by communicating signaling to the first network that is based on the second access method and is directed to the second network via n IWU. In one example, communication at block 1006 can be conducted by providing signaling to an IWU where the signaling is translated and provided to an MME at the second network for subsequent forwarding in the second network. In another example, signaling can be communicated using one or more L3 tunnels. Signaling can additionally and/or alternatively be encapsulated as data packets prior to communication to facilitate forwarding of the signaling using a generic IP packet transport technique.

Figure 11:
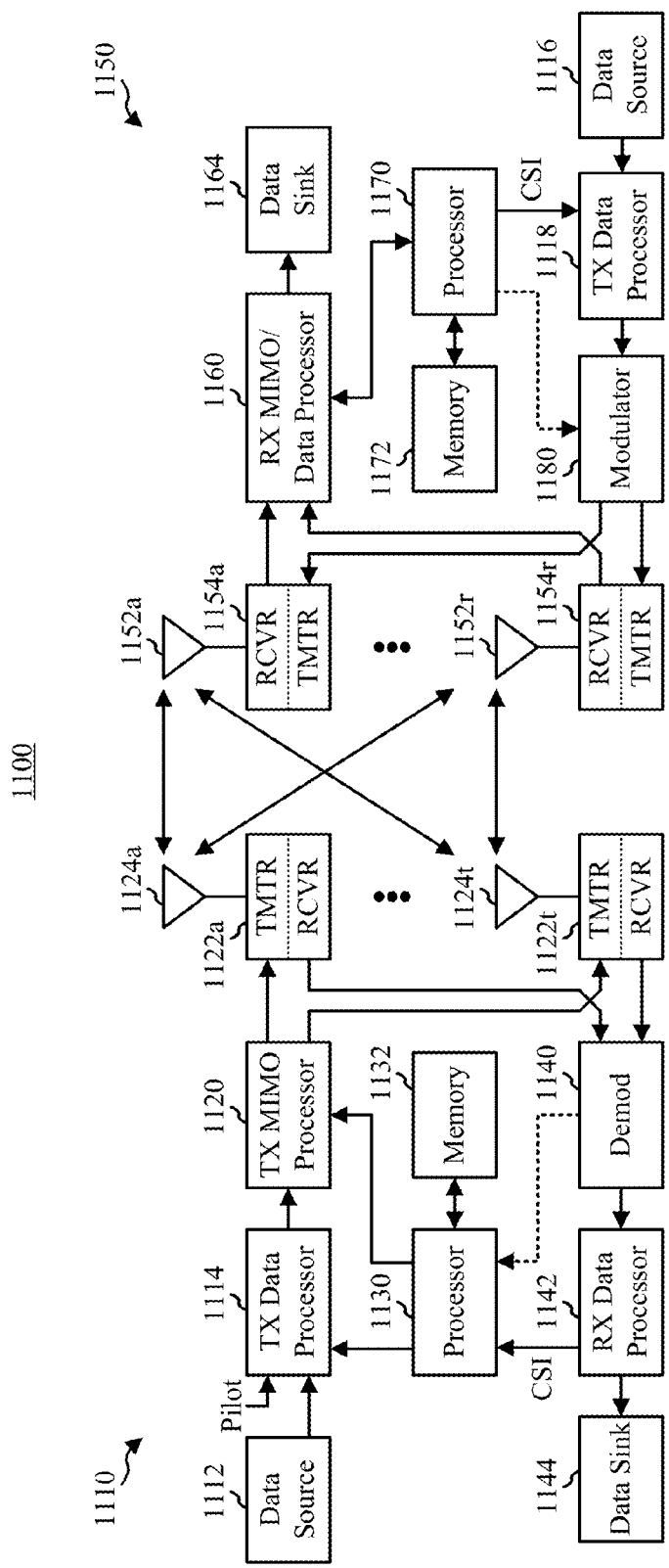
FIG. 11 is a block diagram illustrating an exemplary wireless communication system in accordance with an exemplary embodiment.

Referring now to FIG. 11, a block diagram illustrating an example wireless communication network 1100 in which various aspects described herein can function is provided. In one example, network 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., an access terminal). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX MIMO processor 1120, which can further process the modulation symbols (e.g. for OFDM). TX MIMO processor 1120 can then provide $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g. amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1114 at transmitter system 1110. RX processor 1160 can additionally provide processed symbol streams to a data sink 1164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 12:
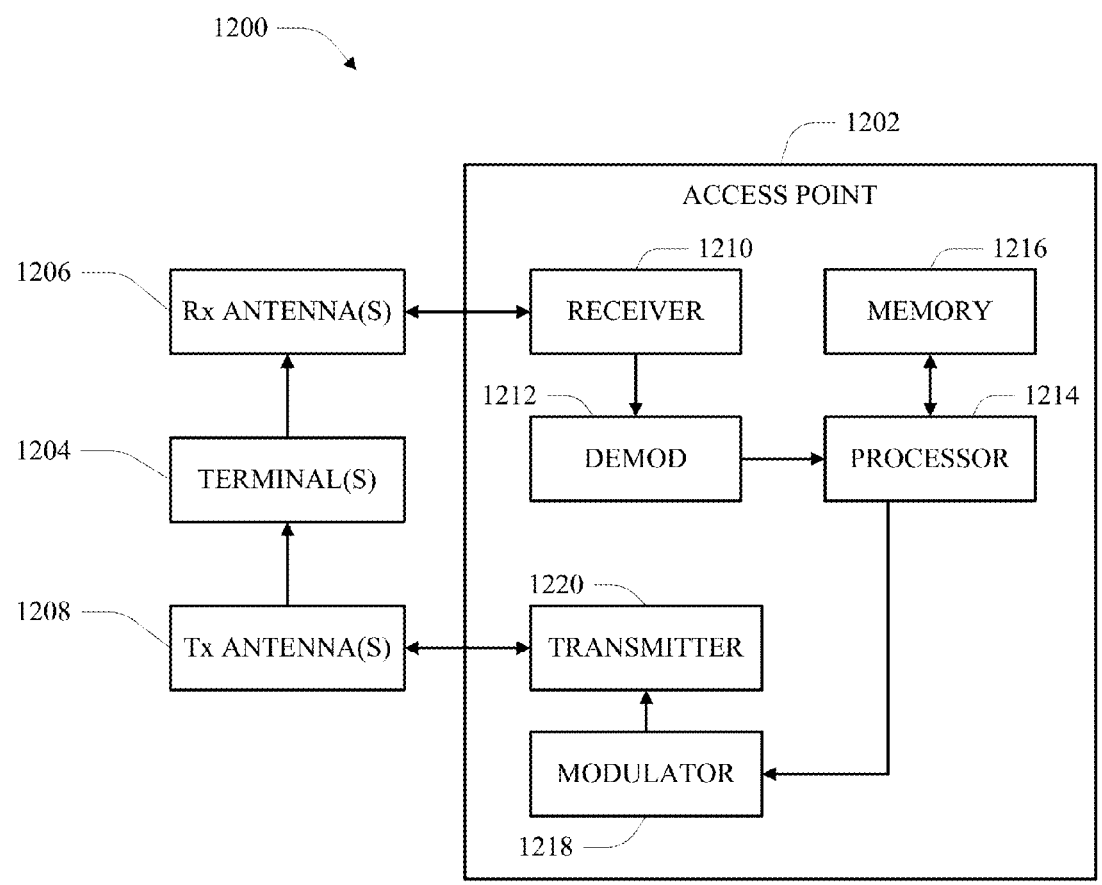
FIGS. 12-14 are block diagrams illustrating exemplary devices in accordance with an exemplary embodiment.

FIG. 12 is a block diagram of a network 1200 that facilitates management of a handoff operation in a wireless communication system in accordance with various aspects described herein. In one example, network 1200 includes a base station or access point 1202. As illustrated, access point 1202 can receive signal(s) from one or more access terminals 1204 via one or more receive (Rx) antennas 1206 and transmit to the one or more access terminals 1204 via one or more transmit (Tx) antennas 1208.

Additionally, access point 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. In one example, access point 1202 can employ processor 1214 to perform methodology 800, and/or other similar and appropriate methodologies. Access point 1202 can also include a modulator 1218 that can multiplex a signal for transmission by a transmitter 1220 through transmit antenna(s) 1208.

Figure 13:
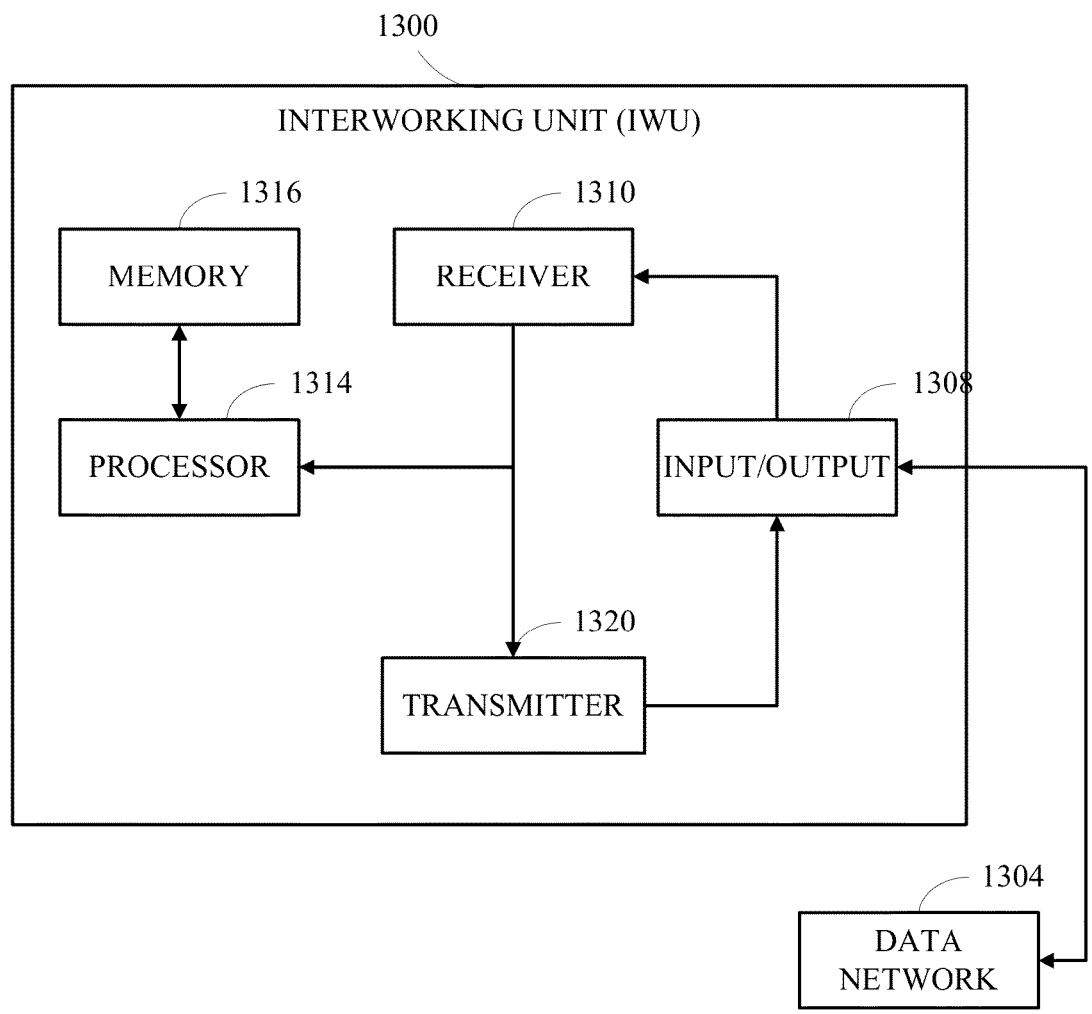

FIG. 13 is a block diagram of an InterWorking Unit (IWU) 1300 that facilitates translation or conversion of target network signaling as received from a source network. As illustrated, IWU 1300 can transmit and receive signaling via a tunnel formed with a source network and IWU 1300 can transmit and receive signaling over a data network interface (e.g., S101) with a target network.

Additionally, IWU 1300 can comprise a receiver 1310 that receives information from an input/output interface 1308 and a transmitter that sends information through input/output interface 1308 by way of data network 1304. IWU 1300 further includes a processor 1314 coupled to memory 1316, which can store data and/or program codes to perform methodology 900 and/or other similar and appropriate methodologies.

Figure 14:
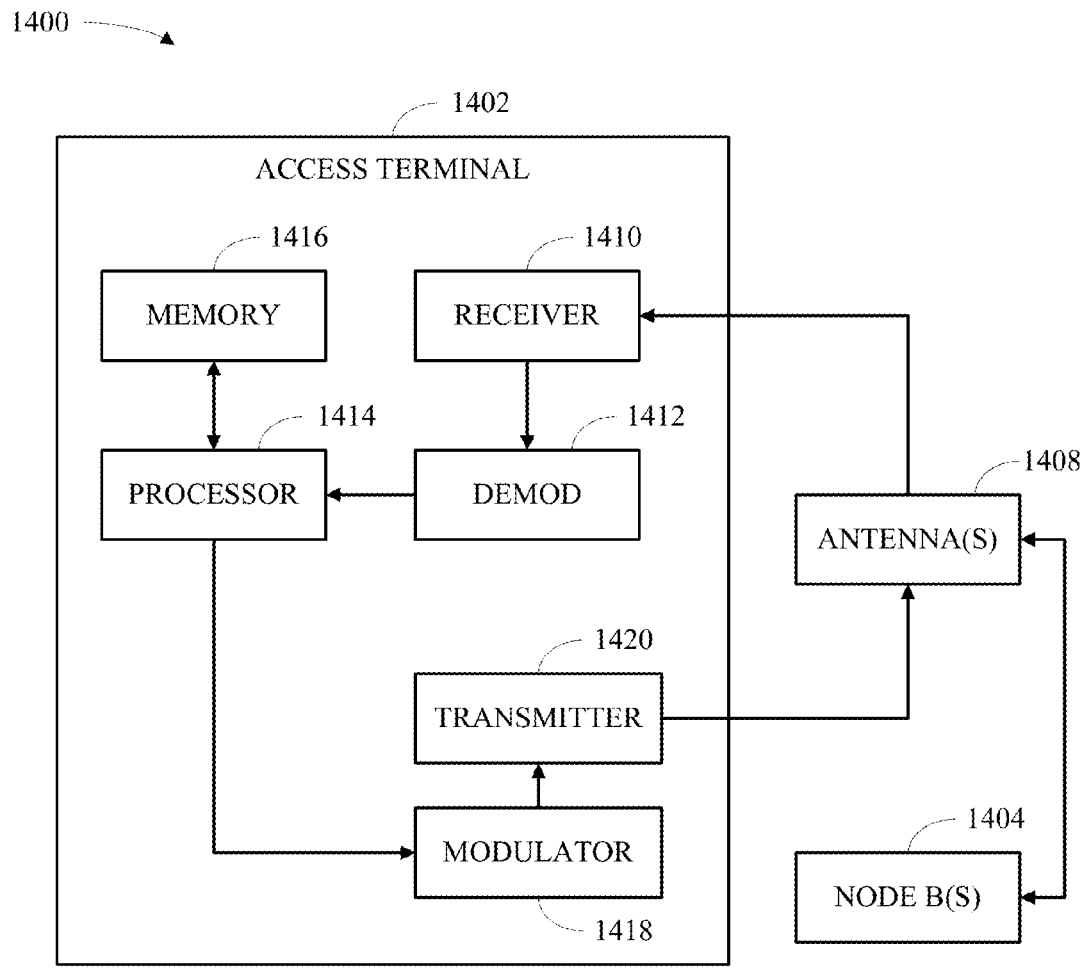

FIG. 14 is a block diagram of an additional network 1400 that facilitates management of a handoff in a wireless communication system in accordance with various aspects described herein. In one example, network 1400 includes an access terminal 1402. As illustrated, access terminal 1402 can receive signal(s) from one or more Node Bs 1404 and transmit to the one or more Node Bs 1404 via one or more antennas 1408. Additionally, access terminal 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to access terminal 1402. Additionally, access terminal 1402 can employ processor 1414 to perform methodology 1000 and/or other similar and appropriate methodologies. Access terminal 1402 can also include a modulator 1418 that can multiplex a signal for transmission by a transmitter 1420 through antenna(s) 1408.

Figure 15:
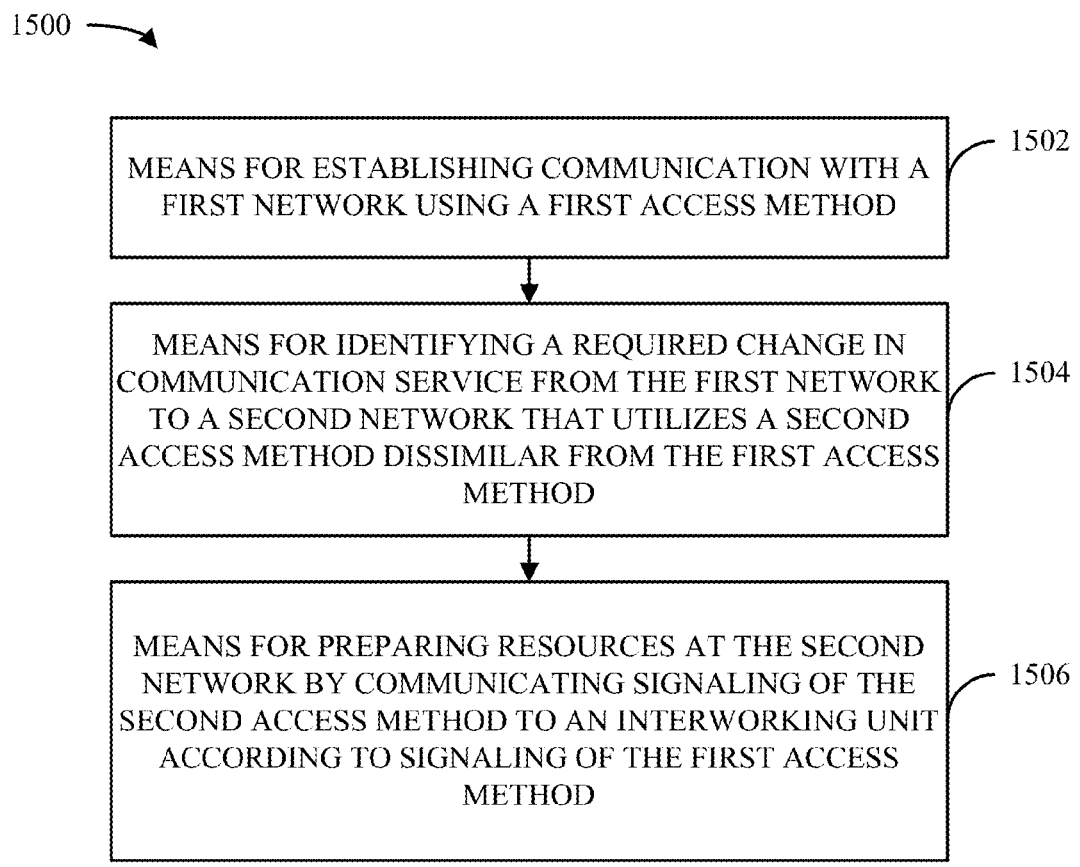
FIGS. 15-17 are block diagrams of respective apparatuses that facilitate inter-network handoffs in a wireless communication system.

FIG. 15 illustrates an apparatus 1500 that facilitates handoff preparation and management in a wireless communication system. It is to be appreciated that apparatus 1500 is represented as including functional blocks, which can be functional blocks that represent functions implemented by a processor, software, or combination thereof (e.g., firmware). Apparatus 1500 can be implemented in an access point (e.g., source system 220), an access terminal (e.g. access terminal 210), and/or any other appropriate network entity and can include a means 1502 for establishing communication with a first network using a first access method, a means 1504 for identifying a required change in communication service from the first network to a second network that utilizes a second access method dissimilar from the first access method, and a means 1506 for tunneling the received signaling to the target network to facilitate preparation of resources therein upon a positive determination.

Figure 16:
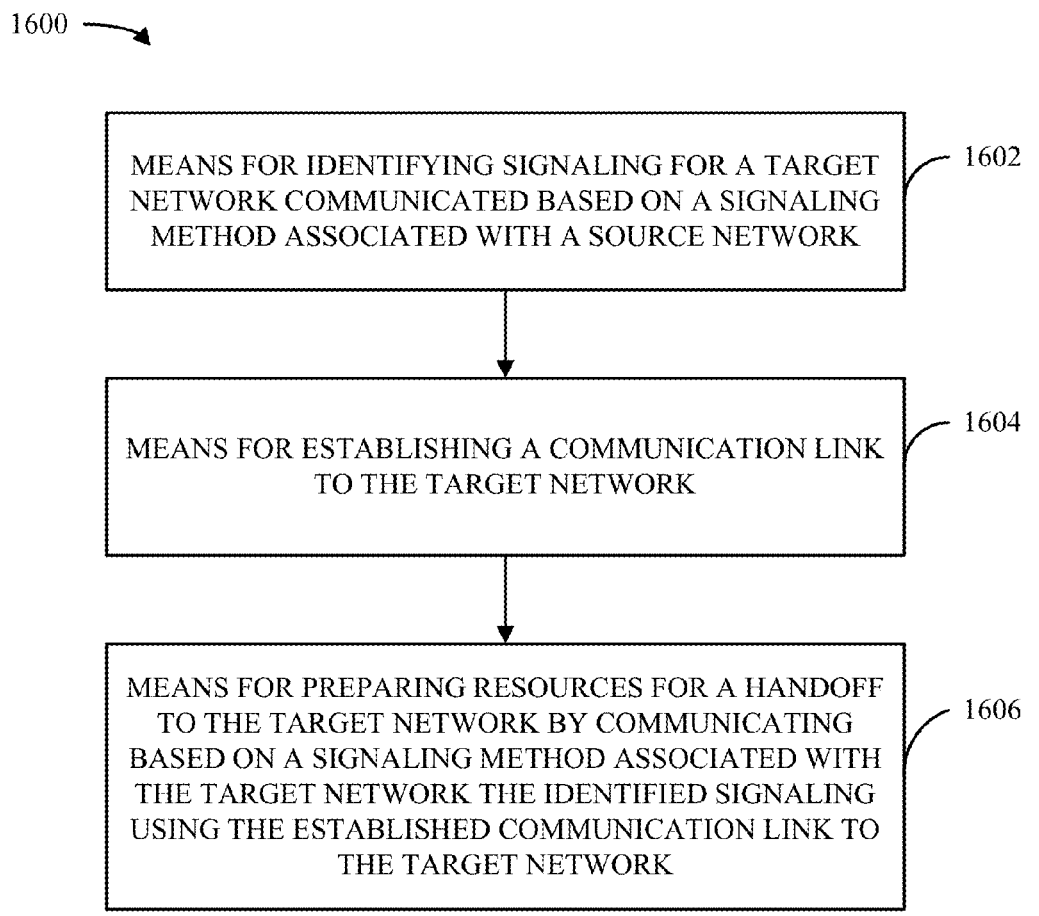

FIG. 16 illustrates an apparatus 1600 that facilitates resource preparation for a handoff from a source system. It is to be appreciated that apparatus 1600 is represented as including functional blocks, which can be functional blocks that represent functions implemented by a processor, software, or combination thereof (e.g., firmware). Apparatus 1600 can be implemented in an interworking unit (IWU) (e.g., IWU 426), an access point (e.g., source network 220), and/or any other appropriate network entity and can include a means 1602 for identifying signaling for a target network communicated based on a signaling method associated with a source network, a means 1604 for establishing a communication link to the target network, and a means 1606 for preparing resources for a handoff to the target network by communicating based on a signaling method associated with the target network the identified signaling using the established communication link to the target network.

Figure 17:
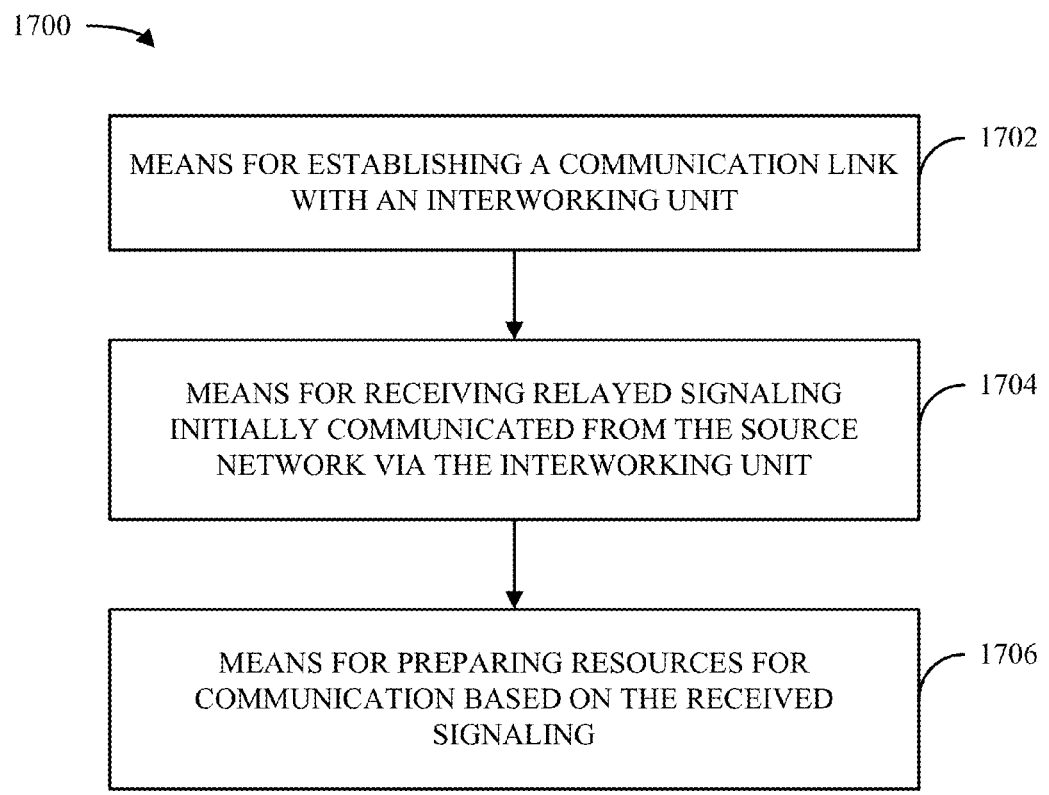

FIG. 17 illustrates an apparatus 1700 that facilitates inter-access system preparation for a handoff in a wireless communication system. It is to be appreciated that apparatus 1700 is represented as including functional blocks, which can be functional blocks that represent functions implemented by a processor, software, or combination thereof (e.g., firmware). Apparatus 1700 can be implemented in a target network (e.g., target network 230) and/or any other appropriate network entity and can include a means 1702 for establishing a communication link with an interworking unit, a means 1704 for receiving relayed signaling initially communicated from the source network via the interworking unit, and a means 1706 for preparing resources for communication based on the received signaling.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a means, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method performed by an access terminal for preparing a handoff from a first network to a second network, comprising:
    establishing communication with a first network using a first access method;
    identifying a required change in communication service from the first network to a second network that utilizes a second access method dissimilar from the first access method;
    transmitting to the second network, via the first network, instructions to initiate a handoff operation;
    preparing resources at the second network by communicating, to an interworking unit over a Layer 3 (L3) tunnel using a dedicated internet protocol (IP) address for the interworking unit stored on the first network, signaling of the second access method for subsequent forwarding to a Mobility Management Entity (MME) according to signaling of the first access method, wherein the second access method is performed according to a an Evolved Universal Terrestrial Radio Access Network (E-UTRAN) protocol; and
    second access method via the interworking unit to the MME at the second network;
    communicating signaling of the second access method via the interworking unit to the MME at the second network.

2. The method of claim 1, wherein the second network comprises an Evolved Universal Terrestrial Radio Access Network (E-UTRAN).

3. The method of claim 1, wherein the preparing comprises:
    encapsulating signaling that is based on the second access method and directed to the second network into respective data packets; and
    communicating the respective data packets to the first network.

4. The method of claim 1, further comprising establishing communication with the second network upon preparing resources at the second network.

5. The method of claim 1, further comprising discovering an address of the interworking unit using the first access method through the first network.

6. The method of claim 1, wherein communicating signaling to the interworking unit further comprises communicating signaling from the first network to the interworking unit over a direct breakout between the first network and the interworking unit.

7. The method of claim 1, wherein the L3 tunnel utilizes a physical path between the first network and the interworking unit.

8. An access terminal, comprising:
    a memory that stores data relating to a first system, a first access method utilized by the first system, a second system, and a second access method utilized by the second system dissimilar from the first access method; and
    a processor configured with software instructions to perform operations comprising:
        identifying a required handoff from the first system to the second system;
        transmitting to the first and second system instructions to initiate a handoff operation; and
        preparing resources for the handoff to the second system by communicating, to an interworking unit over a Layer 3 (L3) tunnel using a dedicated internet protocol (IP) address for the interworking unit stored on the first system, handoff preparation signaling of the second access method for subsequent forwarding to a Mobility Management Entity (MME) according to signaling of the first access method, wherein the second access method is performed according to an Evolved Universal Terrestrial Radio Access Network (E-UTRAN) protocol; and
        communicating handoff preparation signaling of the second access method via the interworking unit to the MME at the second network.

9. The access terminal of claim 8, wherein the processor is configured with software instructions to perform operations further comprising:
    communicating the handoff preparation signaling to the second system as one or more data packets.

10. The access terminal of claim 8, wherein the processor is configured with software instructions to perform operations further comprising:
    establishing communication with the second system upon preparing resources for the handoff thereto.

11. The access terminal of claim 8, wherein the processor is further configured with software instructions to perform operations further comprising:
discovering an address of the interworking unit using the first access method through the first network.

12. The access terminal of claim 8, wherein the processor is configured with software instructions to perform operations further comprising:
communicating signaling from the first network to the interworking unit over a direct breakout between the first network and the interworking unit.

13. The access terminal of claim 8, wherein the L3 tunnel utilizes a physical path between the first system and the interworking unit.

14. A method for managing a handoff in a wireless communication system, comprising:
receiving instructions to initiate a handoff operation from an access terminal;
identifying signaling for a target network communicated based on a signaling method associated with the target network;
establishing a communication link to the target network;
preparing resources for a handoff to the target network by communicating, to an interworking unit over a Layer 3 (L3) tunnel using a dedicated internet protocol (IP) address for the interworking unit stored on a source network, the identified signaling based on a signaling method associated with the target network for subsequent forwarding to a Mobility Management Entity (MME) using the established communication link to the target network, wherein the identified signaling is performed according to a an Evolved Universal Terrestrial Radio Access Network (E-UTRAN) protocol; and
communicating the identified signaling for the target network to the MME at the target network.

15. The method of claim 14, wherein the preparing comprises providing the identified signaling using a protocol that is independent of the signaling method associated with the source network.

16. The method of claim 14, wherein the identifying comprises identifying signaling communicated that is directed to the target network and encapsulated as one or more data packets based on the source network, and the preparing comprises forwarding the one or more data packets to the target network.

17. The method of claim 14, wherein the establishing comprises establishing a communication link to the target network based on an E-UTRAN protocol that is independent of the signaling method of the source network.

18. The method of claim 14, wherein the identifying comprises identifying one or more Non-Access Stratum (NAS) signaling messages.

19. The method of claim 14, wherein the L3 tunnel utilizes a physical path between the source network and the interworking unit.

20. A wireless communications apparatus, comprising:
a memory that stores data relating to a radio access protocol of a source network and a radio access protocol of a target network; and
a processor configured with software instructions to perform operations comprising:
receiving instructions from an access terminal to initiate a handoff operation;
identifying one or more messages communicated, over a Layer 3 (L3) tunnel using a dedicated internet protocol (IP) address for the wireless communications apparatus stored on the source network, by the source network according to an Evolved Universal Terrestrial Radio Access Network (E-UTRAN) protocol utilizing the radio access protocol of the source network; and
preparing resources for a handoff of the access terminal to the target network by forwarding the identified messages received over the L3 tunnel to a Mobility Management Entity (MME) of the target network according to the radio access protocol of the target network.

21. The wireless communications apparatus of claim 20, wherein the processor is configured with software instructions to perform operations further comprising:
cooperatively tunneling the identified messages from the source network using a protocol that is dissimilar from the protocol associated with the target network.

22. The wireless communications apparatus of claim 20, wherein the processor is configured with software instructions to perform operations further comprising:
identifying one or more messages provided in respective data packets over the tunnel from the source network utilizing Internet Protocol (IP) signaling.

23. The wireless communications apparatus of claim 20, wherein the processor is configured with software instructions to perform operations further comprising:
establishing a generic IP tunnel with the source network that is independent of the radio access protocol associated with the target network.

24. The wireless communications apparatus of claim 20, wherein the processor is configured with software instructions to perform operations further comprising:
establishing the tunnel with the source system in response to receiving instructions to initiate the handoff operation.

25. The wireless communications apparatus of claim 20, wherein the identified one or more messages comprise one or more Non-Access Stratum (NAS) signaling messages.

26. The wireless communications apparatus of claim 20, wherein the L3 tunnel utilizes a physical path between the source network and the interworking unit.

27. An apparatus that facilitates handoff preparation and management in a wireless communication system, the apparatus comprising:
means for receiving instructions from an access terminal to initiate a handoff operation;
means for identifying signaling for a target network communicated based on a signaling method associated with the target network;
means for establishing a communication link to the target network;
means for preparing resources for a handoff to the target network by communicating, to an interworking unit over a Layer 3 (L3) tunnel using a dedicated internet protocol (IP) address for the interworking unit stored on a source network, the identified signaling based on a signaling method associated with the target network for subsequent forwarding to a Mobility Management Entity (MME) using the established communication link to the target network, wherein the identified signaling is performed according to an Evolved Universal Terrestrial Radio Access Network (E-UTRAN) protocol; and
means for communicating the identified signaling for the target network from the interworking unit to the MME at the target network.

28. The apparatus of claim 27, wherein the L3 tunnel utilizes a physical path between the source network and the interworking unit.

29. A non-transitory computer-readable medium having stored thereon processor-executable instructions configured to cause a processor to perform operations comprising:
receiving instructions from an access terminal to initiate a handoff operation;
identifying signaling for a target network communicated based on a signaling method associated with a source network;
establishing a communication link to the target network;
preparing resources for a handoff to the target network by communicating, to an interworking unit over a Layer 3 (L3) tunnel using a dedicated internet protocol (IP) address for the interworking unit stored on the source network, the identified signaling based on a signaling method associated with the target network for subsequent forwarding to a Mobility Management Entity (MME) using the established communication link to the target network, wherein the identified signaling to the interworking unit over the L3 tunnel is performed according to an Evolved Universal Terrestrial Radio Access Network (E-UTRAN) protocol; and
communicating the identified signaling for the target network to the MME at the target network.

30. The non-transitory computer-readable medium of claim 29, wherein the stored processor-executable instructions are configured to cause the processor of the access terminal to perform operations such that the L3 tunnel utilizes a physical path between the source network and the interworking unit.

31. A method for preparing resources for communication, comprising:
receiving instructions from an access terminal to initiate a handoff operation;
establishing a communication link with a source network via an interworking unit;
receiving, via the interworking unit, relayed signaling initially communicated from the source network to the interworking unit over a Layer 3 (L3) tunnel using a dedicated internet protocol (IP) address for the interworking unit stored on the source network, wherein the signaling is performed according to a an Evolved Universal Terrestrial Radio Access Network (E-UTRAN) protocol; and
preparing resources for communication based on the received signaling.

32. The method of claim 31, wherein the target network is an Evolved Universal Terrestrial Radio Access Network (E-UTRAN).

33. The method of claim 31, wherein the receiving comprises receiving the relayed signaling using a protocol independent of a protocol associated with the source network.

34. The method of claim 31, wherein the relayed signaling comprises one or more Non-Access Stratum (NAS) signaling messages.

35. The method of claim 31, wherein the L3 tunnel utilizes a physical path between the source network and the interworking unit.

36. A wireless communications apparatus, comprising:
a memory that stores data relating to a communication link with an interworking unit and a target system access method; and
a processor configured with software instructions to perform operations comprising:
receiving instructions from an access terminal to initiate a handoff operation; and
receiving, from the interworking unit, signaling initially communicated from a source network to the interworking unit over a Layer 3 (L3) tunnel using a dedicated internet protocol (IP) address for the interworking unit stored on the source network, wherein the signaling utilizes the target system access method stored by the memory and is directed to the wireless communications apparatus from the interworking unit over the communication link, wherein the signaling is performed according to an Evolved Universal Terrestrial Radio Access Network (E-UTRAN) protocol.

37. The wireless communications apparatus of claim 36, wherein the processor is further configured with software instructions to perform operations further comprising:
preparing resources for communication pursuant to a handoff from the source network based on the received signaling.

38. The wireless communications apparatus of claim 36, wherein the target system is an Evolved Universal Terrestrial Radio Access Network (E-UTRAN).

39. The wireless communications apparatus of claim 36, wherein the processor is configured with software instructions to perform operations further comprising:
receiving the signaling from the interworking unit at the Mobility Management Entity (MME) over a communication tunnel.

40. The wireless communications apparatus of claim 36, wherein the one or more signaling messages comprise one or more Non-Access Stratum (NAS) signaling messages.

41. The wireless communications apparatus of claim 36, wherein the L3 tunnel utilizes a physical path between the source network and the interworking unit.

* * * * *